(12) United States Patent
Tanaka et al.

(10) Patent No.: US 6,588,197 B2
(45) Date of Patent: Jul. 8, 2003

(54) STEAM CONTROL APPARATUS FOR TURBINE

(75) Inventors: Tomoka Tanaka, Takasago (JP);
Shouichi Nagata, Takasago (JP);
Kazuya Higashi, Takasago (JP); Koji Hiramoto, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/835,354

(22) Filed: Apr. 17, 2001

(65) Prior Publication Data

US 2001/0031199 A1 Oct. 18, 2001

(30) Foreign Application Priority Data

Apr. 18, 2000 (JP) ........................ 2000-116337
Mar. 6, 2001 (JP) ........................ 2001-061327

(51) Int. Cl.[7] ................................. F02C 6/18
(52) U.S. Cl. ........................ 60/39.182; 60/806
(58) Field of Search ................ 60/39.182, 806

(56) References Cited

U.S. PATENT DOCUMENTS

| 5,577,377 A | 11/1996 | Tomlinson |
| 5,779,442 A | 7/1998 | Sexton et al. |
| 5,906,473 A | 5/1999 | Sexton et al. |
| 5,913,658 A | 6/1999 | Sexton et al. |
| 6,205,762 B1 * | 3/2001 | Uematsu et al. ......... 60/39.182 |
| 6,272,841 B2 * | 8/2001 | Yamamoto et al. ...... 60/39.182 |
| 6,389,797 B1 * | 5/2002 | Sugishita et al. ........ 60/39.182 |
| 6,442,927 B1 * | 9/2002 | Matsuura et al. ........ 60/39.182 |

FOREIGN PATENT DOCUMENTS

GB 2236145 3/1991

* cited by examiner

*Primary Examiner*—Louis J. Casaregola
(74) *Attorney, Agent, or Firm*—Wenderoth, Lind & Ponack, L.L.P.

(57) ABSTRACT

The temperature and flow rate of steam introduced to a gas turbine and a combustor is controlled properly through mixing intermediate-pressure steam and high-pressure steam. Thus, two different requirements, i.e., adjustment of steam temperature and securing of a sufficient steam flow rate, can be satisfied simultaneously. As a result, it becomes possible to simultaneously achieve control of the clearance of the blade ring of the gas turbine by means of steam and cooling of the combustor by means of steam.

6 Claims, 13 Drawing Sheets

Gas Turbine Output (%)

STEAM CONTROL APPARATUS FOR TURBINE

The entire disclosures of Japanese Patent Application Nos. 2000-116337 filed on Apr. 18, 2000 and 2001-61327 filed on Mar. 6, 2001, including specifications, claims, drawings and summaries are incorporated herein by reference in their entirety.

BACKGROUND OF THE INVENTION

1. Field of the Invention

The present invention relates to a steam control apparatus for a turbine which introduces steam from a waste heat recovery boiler, or fluid from an auxiliary passage, to a blade ring of a gas turbine and a high-temperature component, such as a combustor, to thereby effect temperature control.

2. Description of the Related Art

From the viewpoint of economy and effective use of energy resources, various measures for improving efficiency have been implemented in power generation facilities (power generation plants). One measure is employment of a turbine power generation plant (a combined cycle power generation plant) in which a gas turbine and a steam turbine are combined. In a combined cycle power generation plant, high-temperature exhaust gas from a gas turbine is fed to a waste heat recovery boiler, in which steam is generated via a superheating unit, and the thus-generated steam is fed to a steam turbine, in which the generated steam performs work.

High-temperature components, such as a combustor, of a gas turbine has been cooled by means of air. However, in order to cope with a recent increase in combustion temperature, cooling by means of steam has come into use. In relation to a combined cycle power generation plant as well, there is a plan to use a steam turbine in combination with a gas turbine in which high-temperature components such as a combustor are cooled by means of steam, to thereby obtain a highly efficient power generation plant. Moreover, in order to cope with a recent increase in operation temperature of a gas turbine, various studies have been performed on a technique for introducing steam to the blade ring portion of the turbine so as to optimally control the clearance between the blade ring portion and moving blades. That is, there is a plan to effect temperature control by means of steam in order to prevent contact between the moving blades and the blade ring portion at the time of startup and to maintain a minimum clearance between the moving blades and the blade ring portion during ordinary operation, to thereby achieve safety and high efficiency simultaneously.

In relation to a combined cycle power generation plant, various studies have been performed on a technique for introducing steam to the blade ring portion of the turbine so as to optimally control the clearance between the blade ring portion and moving blades and for cooling high-temperature components such as a combustor by means of steam.

Control of the clearance between the moving blades and the blade ring portion must be performed differently from cooling of high-temperature components such as a combustor by means of steam. Specifically, the clearance control must be performed such that at the time of startup, the clearance is made relatively large through introduction of steam of relatively high temperature, and during ordinary operation, the clearance is made relatively small through introduction of steam of relatively low temperature. In contrast, cooling of high-temperature components must be performed through introduction of steam of low temperature. As described above, when control of the clearance between the moving blades and the blade ring portion by means of steam and cooling of high-temperature components, such as a combustor, by means of steam are performed, steam must be introduced while the flow rate of steam, etc. are controlled in order to simultaneously satisfy a temperature requirement in clearance control and a temperature requirement in cooling. However, in the existing combined cycle power generation plant, a satisfactory technique for steam control which satisfies the two different requirements regarding temperature has not been established.

SUMMARY OF THE INVENTION

In view of the foregoing, an object of the present invention is to provide a steam control apparatus for a turbine which can achieve control of the clearance of a blade ring portion by means of steam and cooling of high-temperature components such as a combustor by means of steam.

In order to achieve the above object, the present invention provides a steam control apparatus for a turbine, comprising a waste heat recovery boiler including a high-pressure unit for generating high-pressure steam by use of exhaust gas of the gas turbine, and a low-pressure unit for generating low-pressure steam by use of exhaust gas of the gas turbine. A steam turbine is operated by means of steam generated by the waste heat recovery boiler. A low-pressure-side steam introduction passage introduces low-pressure steam from the low-pressure unit of the waste heat recovery boiler to the steam turbine. A high-pressure-side steam introduction passage introduces high-pressure steam from the high-pressure unit of the waste heat recovery boiler to the steam turbine. A steam passage branches off the low-pressure-side steam introduction passage and serves as a bypass for introducing low-pressure steam from the low-pressure unit to a blade ring of the gas turbine and a high-temperature component. A high-pressure steam passage branches off the high-pressure-side steam introduction passage and merges into the steam passage on the upstream side of the blade ring of the gas turbine and the high-temperature component. A flow-rate adjustment-control unit adjusts the flow rate of steam flowing through the steam passage and the flow rate of steam flowing through the high-pressure steam passage to thereby adjust the flow rate and temperature of steam flowing through the blade ring of the gas turbine and the high-temperature component. In the steam control apparatus of the present invention, since the temperature and flow rate of steam introduced to the turbine and the high-temperature component can be controlled properly through mixing high-pressure steam and intermediate-pressure steam, two different requirements, i.e. adjustment of steam temperature and securing of a sufficient steam flow rate, can be satisfied simultaneously. As a result, it becomes possible to simultaneously achieve control of the clearance of the blade ring by means of steam and cooling of the high-temperature component by means of steam.

Preferably, the flow-rate adjustment-control unit comprises a first flow control valve provided in the low-pressure-side steam introduction passage on the downstream side of the branching portion of the steam passage and adapted to control the flow rate of steam flowing through the steam passage through adjustment of the flow rate of steam flowing through the steam turbine. A second flow control valve is provided in the high-pressure steam passage and adapted to control the temperature of steam flowing through the steam passage through adjustment of the flow rate of high-pressure steam. A temperature detector detects the temperature of steam flowing thorough the steam passage on the downstream side of the merging portion of the high-pressure steam passage. A pressure detector detects the pressure of steam flowing through the steam passage on the downstream side of the merging portion of the high-pressure steam passage. A control unit controls the first and second flow control valves on the basis of the temperature detected by the temperature detector and the pressure detected by the pressure detector in order to maintain, at predetermined values, the flow rate and temperature of steam flowing through the blade ring of the gas turbine and the high-temperature component.

In this case, two different requirements, i.e., adjustment of steam temperature and securing of a sufficient steam flow rate, can be satisfied simultaneously without use of expensive detection means or valve members.

Preferably, the high-temperature component is a combustor. The pressure detector is a differential-pressure detector for detecting a difference in steam pressure between the inlet and outlet of the combustor. An auxiliary fluid introduction passage having a third flow control valve merges into the high-pressure steam passage on the downstream side of the second flow control valve. A second temperature detector is provided in the high-pressure steam passage on the downstream side of the merging portion of the auxiliary fluid introduction passage. The control unit has a function for opening and closing the first flow control valve on the basis of detection information output from the differential-pressure detector, opening and closing the second flow control valve on the basis of detection information output from the differential-pressure detector and detection information output from the temperature detector, and opening and closing the third flow control valve on the basis of detection information output from the second temperature detector, such that the flow rate of steam flowing through the steam passage increases with output of the gas turbine, and the steam temperature decreases to a predetermined temperature.

In this case, the two different requirements, i.e., adjustment of steam temperature and securing of a sufficient steam flow rate, can be satisfied simultaneously and optimally, in accordance with the operation conditions of the gas turbine.

Preferably, the control unit has a function used when the second flow control valve is opened and closed on the basis of detection information output from the differential-pressure detector and detection information output from the temperature detector. The function is adapted to compare an open/close command determined on the basis of the detection information output from the differential-pressure detector and an open/close command determined on the basis of the detection information output from the temperature detector and open and close the second flow control valve on the basis of the open/close command which designates a larger opening.

In this case, high-pressure steam can be used as backup steam in order to secure a desired flow rate.

Preferably, the control unit has a function for judging whether the second flow control valve is opened and closed on the basis of the open/close command derived from the detection information output from the differential-pressure detector or the open/close command derived from the detection information output from the temperature detector and a function for setting the opening of the third flow control valve for the case in which the open/close command determined on the basis of the detection information from the differential-pressure detector is used, such that the opening becomes greater than that of the third flow control valve for the case in which the open/close command determined on the basis of the detection information from the temperature detector is used.

In this case, the temperature of high-pressure steam is changed in accordance with the type of control applied to high-pressure steam, whereby the flow rate of the high-pressure steam can be minimized.

Preferably, the high-temperature component is. a combustor. The pressure detector is a differential-pressure detector for detecting a difference in steam pressure between the inlet and outlet of the combustor. An auxiliary fluid introduction passage having a third flow control valve merges into the high-pressure steam passage on the downstream side of the second flow control valve. A second temperature detector is provided in the high-pressure steam passage on the downstream side of the merging portion of the auxiliary fluid introduction passage. The control unit has a function for opening and closing the first flow control valve on the basis of detection information output from the temperature detector, opening and closing the second flow control valve on the basis of detection information output from the differential-pressure detector, and opening and closing the third flow control valve on the basis of detection information output from the second temperature detector, such that the flow rate of steam flowing through the steam passage increases with output of the gas turbine, and the steam temperature is lowered to a predetermined temperature.

In this case, the temperature and flow rate of steam introduced to the blade ring of the turbine and the high-temperature component can be controlled properly through mixing intermediate-pressure steam and high-pressure steam, and two different requirements, i.e. adjustment of steam temperature and securing of a sufficient steam flow rate, can be satisfied simultaneously.

The present invention further provides a steam control apparatus for a turbine, comprising a waste heat recovery boiler including a high-pressure unit for generating high-pressure steam by use of exhaust gas of the gas turbine and a low-pressure unit for generating low-pressure steam by use of exhaust gas of the gas turbine. A steam turbine is operated by means of steam generated by the waste heat recovery boiler. A low-pressure-side steam introduction passage introduces low-pressure steam from the low-pressure unit to the steam turbine. A high-pressure-side steam introduction passage introduces high-pressure steam from the high-pressure unit to the steam turbine. A steam passage branches off the low-pressure-side steam introduction passage and serves as a bypass for introducing low-pressure steam from the low-pressure unit to a blade ring of the gas turbine and a high-temperature component. Aa first flow control valve is provided in the low-pressure-side steam introduction passage on the downstream side of the branching portion of the steam passage and adapted to control the flow rate of steam introduced to the steam passage. A passed-steam-temperature detector detects the temperature of steam after passing through the blade ring of the gas turbine and the high-temperature component. A control unit opens and closes the first flow control valve on the basis of detection information output from the passed-steam-temperature detector in order to adjust the flow rate of steam introduced to the steam passage to thereby maintain, at a predetermined level, the flow rate of steam flowing through the blade ring of the gas turbine and the high-temperature component.

In this steam control apparatus, since the temperature and flow rate of steam introduced to the turbine and the high-temperature component can be controlled properly through mixing intermediate-pressure steam and high-pressure steam, two different requirements, i.e. adjustment of steam temperature and securing of a sufficient steam flow rate, can be satisfied simultaneously. In addition, when the steam temperature increases as a result of performance of temperature control, the first flow control valve is controlled to increase the flow rate of steam introduced to the blade ring of the gas turbine and the high-temperature component so that the flow rate of steam for temperature control increases, and the blade ring and the high-temperature component are protected. As a result, it becomes possible to simultaneously achieve control of the clearance of the blade ring by means of steam and cooling of the high-temperature component, such as a combustor, by means of steam, with high reliability. In addition, the blade ring and the high-temperature component can be protected without use of an interlock function, even when the outlet side temperature of the high-temperature component increases.

The present invention further provides a steam control apparatus for a turbine, comprising a waste heat recovery boiler including a high-pressure unit for generating high-pressure steam by use of exhaust gas of the gas turbine and a low-pressure unit for generating low-pressure steam by use of exhaust gas of the gas turbine. A steam turbine is operated by means of steam generated by the waste heat recovery boiler. A low-pressure-side steam introduction passage introduces low-pressure steam from the low-pressure unit to the steam turbine. A high-pressure-side steam introduction passage introduces high-pressure steam from the high-pressure unit to the steam turbine. A high-pressure steam passage branches off the high-pressure-side steam introduction passage and serves as a bypass for introducing high-pressure steam to a blade ring of the gas turbine and a high-temperature component. A second flow control valve is provided in the high-pressure steam passage. A passed-steam-temperature detector detects the temperature of steam after passing through the blade ring of the gas turbine and the high-temperature component. A control unit opens and closes the second flow control valve on the basis of detection information output from the passed-steam-temperature detector in order to adjust the flow rate of steam flowing trough the high-pressure steam passage to thereby maintain at a predetermined level, the flow rate of steam flowing through the blade ring of the gas turbine and the high-temperature component.

In the steam control apparatus of the present invention, since the temperature and flow rate of steam introduced to the blade ring of the turbine and the high-temperature component can be controlled properly through mixing intermediate-pressure steam and high-pressure steam, two different requirements, i.e. adjustment of steam temperature and securing of a sufficient steam flow rate, can be satisfied simultaneously. In addition, when the steam temperature increases as a result of performance of temperature control, the second flow control valve is controlled to increase the flow rate of steam introduced to the blade ring of the gas turbine and the high-temperature component, so that the flow rate of steam for temperature control increases, and the blade ring and the high-temperature component are protected. As a result, it becomes possible to simultaneously achieve control of the clearance of the blade ring by means of steam and cooling of the high-temperature component, such as a combustor, by means of steam, with high reliability. In addition, the blade ring and the high-temperature component can be protected without use of an interlock function even when the outlet side temperature of the high-temperature component increases.

The present invention further provides a steam control apparatus for a turbine, comprising a waste heat recovery boiler including a high-pressure unit for generating high-pressure steam by use of exhaust gas of the gas turbine and a low-pressure unit for generating low-pressure steam by use of exhaust gas of the gas turbine. A steam turbine is operated by means of steam generated by the waste heat recovery boiler. A low-pressure-side steam introduction passage introduces low-pressure steam from the low-pressure unit to the steam turbine. A high-pressure-side steam introduction passage introduces high-pressure steam from the high-pressure unit to the steam turbine. A steam passage branches off the low-pressure-side steam introduction passage and serves as a bypass for introducing low-pressure steam from the low-pressure unit to a blade ring of the gas turbine and a high-temperature component. A high-pressure steam passage branches off the high-pressure-side steam introduction passage and merges into the steam passage on the upstream side of the blade ring of the gas turbine and the high-temperature component. A first flow control valve is provided in the low-pressure-side steam introduction passage on the downstream side of the branching portion of the steam passage and adapted to control the flow rate of steam introduced to the steam passage. A second flow control valve is provided in the high-pressure steam passage. A passed-steam-temperature detector detects the temperature of steam after passing through the blade ring of the gas turbine and the high-temperature component. A control unit opens and closes the first flow control valve on the basis of detection information output from the passed-steam-temperature detector in order to adjust the flow rate of steam introduced to the steam passage, and opens and closes the second flow control valve on the basis of detection information output from the passed-steam-temperature detector in order to adjust the flow rate of steam flowing trough the high-pressure steam passage, to thereby maintain, at a predetermined level, the flow rate of steam flowing through the blade ring of the gas turbine and the high-temperature component.

In this steam control apparatus, the flow rate and temperature of steam introduced to the blade ring of the gas turbine and the high-temperature component can be controlled properly, so that two different requirements, i.e. adjustment of steam temperature and securing of a sufficient steam flow rate, can be satisfied simultaneously. In addition, when the steam temperature increases as a result of performance of temperature control, the first and second flow control valves are controlled to increase the flow rate of steam introduced to the blade ring of the gas turbine and the high-temperature component so that the flow rate of steam for temperature control increases and the blade ring and the high-temperature component are protected. As a result, it becomes possible to simultaneously achieve control of the clearance of the blade ring by means of steam and cooling of the high-temperature component, such as a combustor, by means of steam with high reliability. In addition, the blade ring and the high-temperature component can be protected without use of an interlock function even when the outlet side temperature of the high-temperature component increases.

Preferably, a fourth flow control valve is provided in the steam passage on the downstream side of the blade ring of the gas turbine and the high-temperature component and the control unit has a function for opening and closing the fourth flow control valve on the basis of detection information output from the passed-steam-temperature detector in order to control the flow rate of steam flowing through the steam passage to thereby secure the steam flow rate of the steam passage and a function for fully opening the fourth flow control valve when the passed-steam-temperature detector detects that the steam temperature exceeds an upper limit.

In this case, when the steam temperature exceeds the upper limit, steam can flow through the steam passage at the maximum flow rate.

DESCRIPTION OF THE PREFERRED EMBODIMENTS

Figure 1:
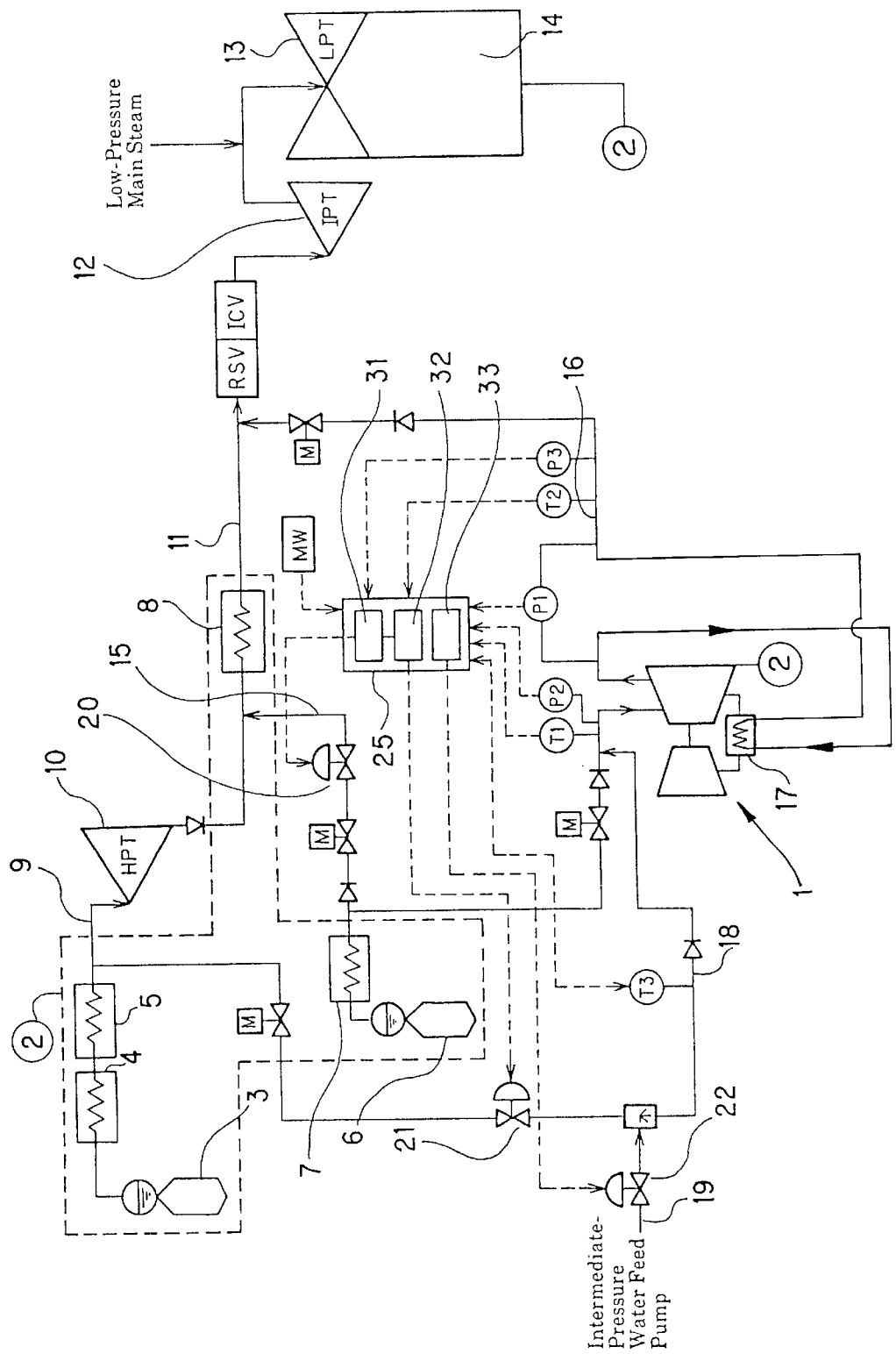
FIG. 1 is a schematic diagram showing the configuration of a combined cycle power generation plant equipped with a steam control apparatus for a turbine according to a first embodiment of the present invention.
Figure 2:
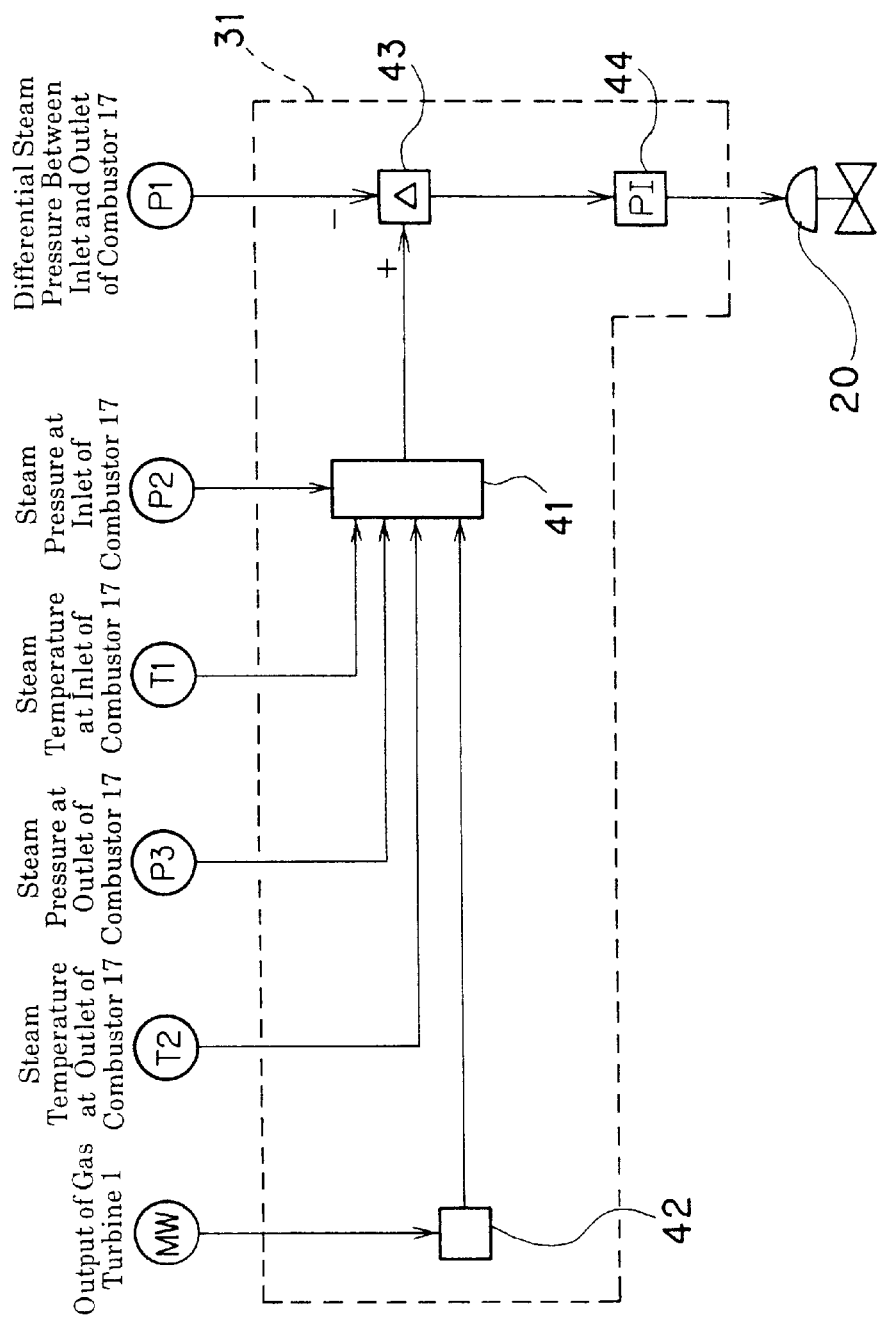
FIG. 2 is a block diagram of a first output section for controlling a first flow control valve.
Figure 3:
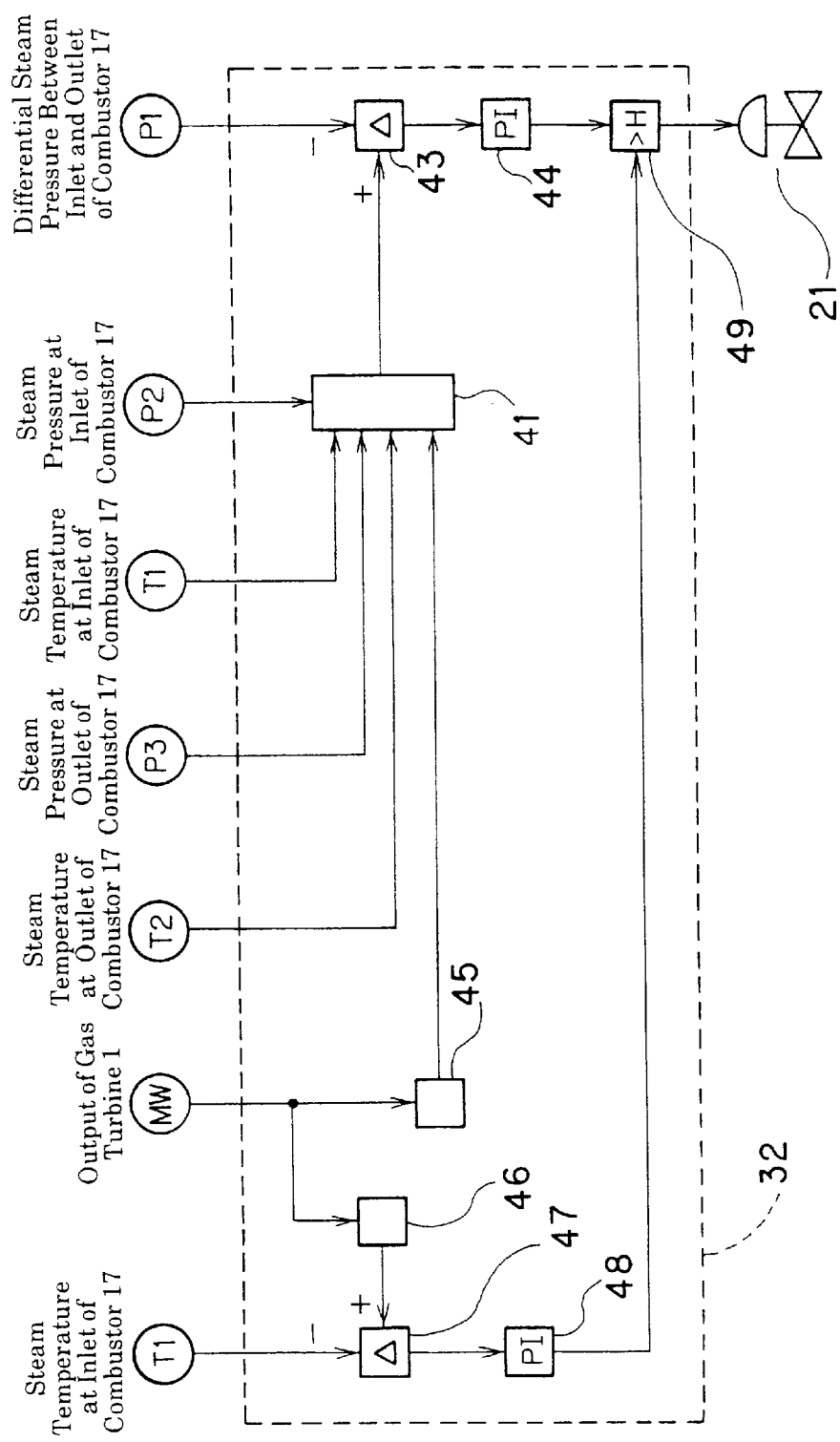
FIG. 3 is a block diagram of a second output section for controlling a second flow control valve.
Figure 4:
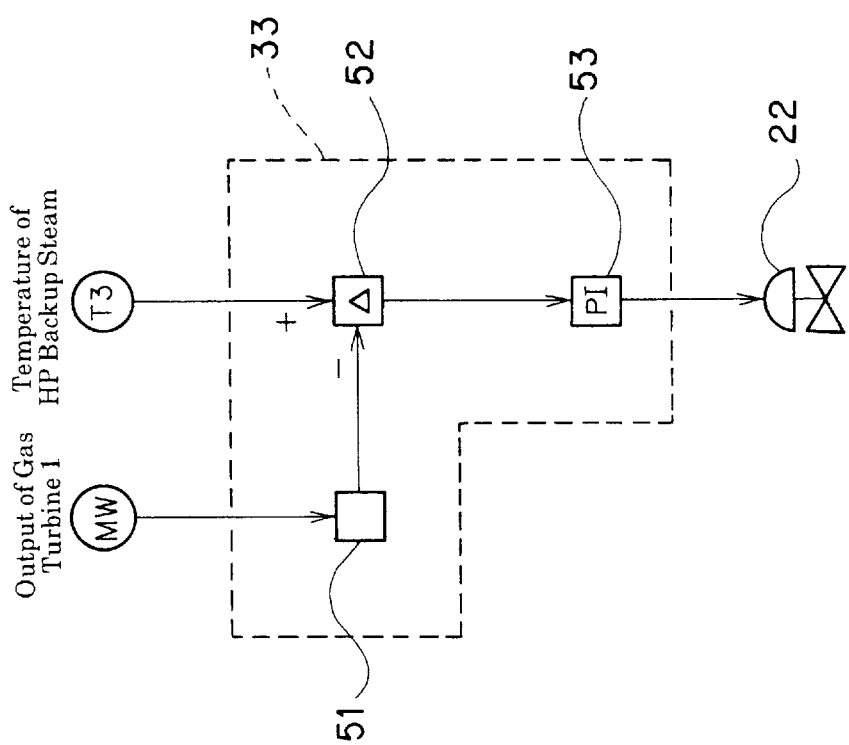
FIG. 4 is a block diagram of a third output section for controlling a third flow control valve.
Figure 5:
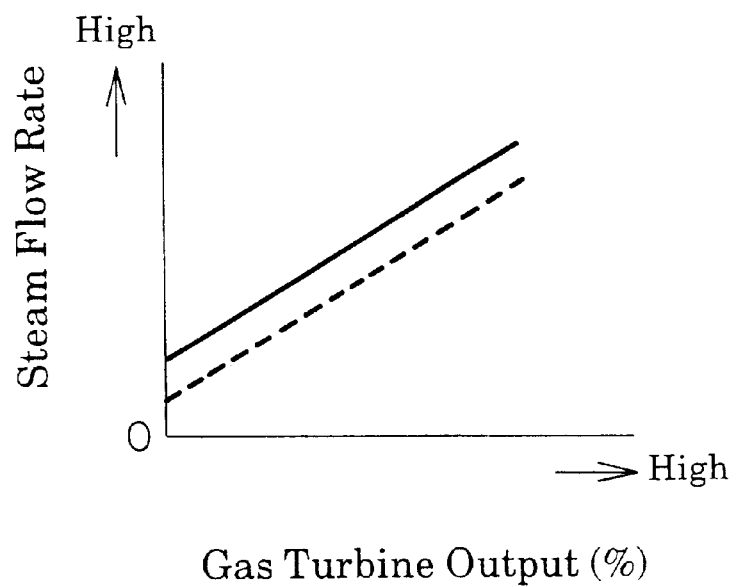
FIG. 5 is a graph showing the relation between gas turbine output and steam flow rate.
Figure 6:
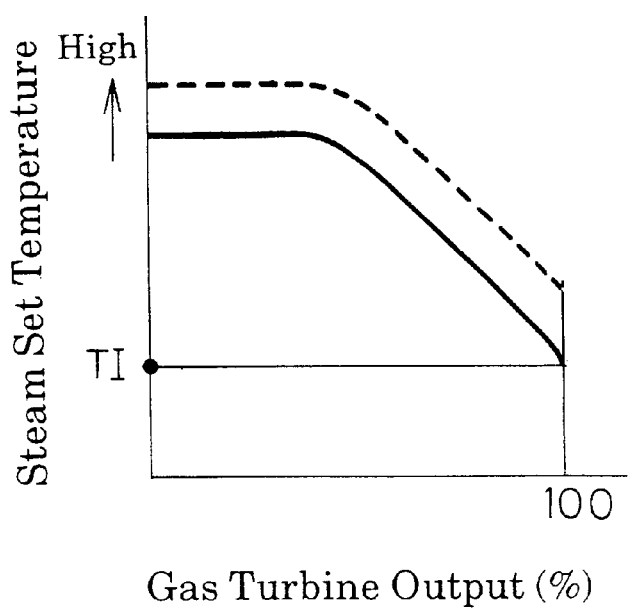
FIG. 6 is a graph showing the relation between gas turbine output and steam set temperature.

FIG. 1 schematically shows the system of a combined cycle power generation plant equipped with a steam control apparatus for a turbine according to a first embodiment of the present invention. FIGS. 2 through 4 show block diagrams of output sections for controlling first through third flow control valves. FIG. 5 shows the relation between gas turbine output and steam flow rate. FIG. 6 shows the relation between gas turbine output and steam set temperature.

As shown in FIG. 1, exhaust gas from a gas turbine 1 is fed to a waste heat recovery boiler 2. In the waste heat recovery boiler 2, a high-pressure drum 3, a first high-pressure superheater 4, and a second high-pressure superheater 5 are provided to form a high-pressure-side unit, and an intermediate-pressure drum 6, an intermediate-pressure superheater 7, and a reheater 8 are provided to form a low-pressure-side unit. Those components shown inside the dashed line of the waste heat recovery boiler 2 are part of the waste heat recovery boiler 2. Steam (high-pressure steam) generated in the high-pressure drum 3 is fed through a high-pressure-side steam introduction passage 9 to a high-pressure steam turbine 10 via the first high-pressure superheater 4 and the second high-pressure superheater 5. Steam discharged from the high-pressure steam turbine 10 is fed through a steam introduction passage 11 to an intermediate-pressure steam turbine 12 via the reheater 8. Steam discharged from the intermediate-pressure steam turbine 12 is fed to a low-pressure steam turbine 13 and is then condensed by a condenser 14, and the thus-produced condensate is collected to the waste heat recovery boiler 2. Meanwhile, steam (low-pressure steam) generated in the intermediate-pressure drum 6 is fed through an intermediate-pressure-side steam introduction passage 15, serving as a low-pressure-side steam introduction passage, to the intermediate-pressure steam turbine 12 via the intermediate-pressure superheater 7 and the reheater 8.

A steam passage 16 branches off the intermediate-pressure-side steam introduction passage 15. The steam passage 16 provides a bypass flow of steam flowing through the blade ring of the gas turbine 1 and a combustor 17, which is a high-temperature component, and merges into the steam introduction passage 11 on the inlet side of the intermediate-pressure steam turbine 12. Further, a high-pressure steam passage 18 branches off the high-pressure-side steam introduction passage 9 on the downstream side of the second high-pressure superheater 5. The high-pressure steam passage 18 merges into the steam passage 16 on the upstream side of the gas turbine 1. An auxiliary fluid passage 19 to which water is fed from an intermediate-pressure water feed pump merges into the high-pressure steam passage 18.

A first flow control valve 20 is disposed in the intermediate-pressure-side steam introduction passage 15 to be located on the downstream side of the branching portion where the steam passage 16 branches off the intermediate-pressure-side steam introduction passage 15. The flow rate of steam which flows through the intermediate-pressure-side steam introduction passage 15 (steam pressure in the intermediate-pressure drum 6) is adjusted through opening and closing of the first flow control valve 20. A second flow control valve 21 is disposed in the high-pressure steam passage 18 to be located on the upstream side of the merging portion of the auxiliary fluid passage 19. The flow rate of high-pressure steam introduced from the high-pressure steam passage 18 to the steam passage 16 is adjusted through opening and closing of the second flow control valve 21. Thus, the temperature of steam in the steam passage 16 is adjusted. Moreover, a third flow control valve 22 is disposed in the auxiliary fluid passage 19. A proper amount of intermediate-pressure feed water is introduced to the high-pressure steam passage 18 through opening and closing of the third flow control valve 22 to thereby lower the temperature of steam within the high-pressure steam passage 18, whereby the temperature of high-pressure steam introduced to the steam passage 16 is controlled to a predetermined temperature.

Temperature detection means T1 is connected to the steam passage 16 to be located between the gas turbine 1 and the merging portion of the high-pressure steam passage 18. The temperature detection means T1 detects the temperature of steam introduced to the gas turbine 1. Differential-pressure detection means P1 is connected to the steam passage 16 so as to detect a difference in steam pressure between the inlet side and the outlet side of the combustor 17 to thereby detect the differential pressure, i.e. flow rate, of steam flowing through the combustor 17. Second temperature detection means T3 is connected to the high-pressure steam passage 18 to be located on the downstream side of the merging portion of the auxiliary fluid passage 19. The second temperature detection means T3 detects the temperature of steam within the high-pressure steam passage 18. In FIG. 1, reference character P2 denotes inlet-pressure detection means for detecting the pressure of steam within the steam passage 16 on the inlet side of the combustor 17, P3 denotes outlet-pressure detection means for detecting the pressure of steam within the steam passage 16 on the outlet side of the combustor 17, and T2 denotes outlet-temperature detection means for detecting the temperature of steam within the steam passage 16 on the outlet side of the combustor 17.

Detection information output from the temperature detection means T1, the differential-pressure detection means P1, the second temperature detection means T3, the inlet-pressure detection means P2, the outlet-pressure detection means P3, and the outlet-temperature detection means T2 is input to a control unit 25. Further, a signal indicative of output MW of the gas turbine 1 is input to the control unit 25. The control unit 25 includes a first output section 31 for outputting an open/close command to the first flow control valve 20, a second output section 32 for outputting open/close commands to the second flow control valve 21, and a third output section 33 for outputting open/close commands to the third flow control valve 22.

On the basis of the detection information (indicative of differential pressure) output from the differential-pressure detection means P1, the first output section 31 opens or closes the first flow control valve 20 so as to restrict the flow of steam to the intermediate-pressure steam turbine 12, whereby the flow rate of steam flowing through the combustor 17 is controlled properly. On the basis of the detection information output from the differential-pressure detection means P1 and the temperature detection means T1, the second output section 32 opens or closes the second flow control valve 21, and on the basis of the detection information output from the second temperature detection means T3, the third output section 33 opens or closes the third flow control valve 22, whereby the temperature of steam flowing through the gas turbine 1 and the combustor 17 is controlled properly while a proper flow rate is maintained (flow rate adjustment means).

Specifically, in the first output section 31, a flow rate of cooling steam which the combustor 17 requires is calculated, a differential pressure corresponding to the required flow rate of cooling steam is calculated, and an open/close command is output to the first flow control valve 20 such that the differential pressure detected by the differential-pressure detection means P1 becomes equal to the calculated differential pressure (differential-pressure control). Thus, cooling steam of the required flow rate is introduced to the combustor 17. Further, in the second output section 32, a steam temperature which the gas turbine 1 requires is calculated and an open/close command is output to the second flow control valve 21 such that the temperature detected by the temperature detection means T1 becomes equal to the calculated temperature (temperature control). Simultaneously, in the third output section 33, on the basis of the temperature of steam introduced to the steam passage 16 (detection information output from the second temperature detection means T3), an open/close command is output to the third flow control valve 22, whereby the flow rate of intermediate-pressure feed water can be controlled properly, and the temperature of steam within the high-pressure steam passage 18 is lowered to a predetermined temperature.

When the flow rate of steam flowing through the combustor 17 increases or decreases due to temperature control, the first flow control valve 20 is opened or closed on the basis of detection information from the differential-pressure detection means P1, so that the predetermined steam flow rate is secured. When a delay is produced in generation of intermediate-pressure steam due to variation in load or other cause and the absolute flow rate of steam flowing through the steam passage 16 becomes insufficient, backup control is performed preferentially over temperature control. In backup control, the second flow control valve 21 is opened or closed such that the differential pressure detected by the differential-pressure detection means P1 becomes equal to the calculated differential pressure, to thereby introduce high-pressure steam. Thus, a required steam flow rate is secured. That is, even in differential-pressure control, an open/close command is output to the second flow control valve 21, and the opening of the second flow control valve 21 is controlled on the basis of a higher of the value of an opening command output by means of temperature control and the value of an opening command output by means of differential-pressure control.

In the above-described steam control apparatus, low-temperature steam generated in the intermediate-pressure drum 6 and high-temperature steam generated in the high-pressure drum 3 are mixed, and the mixed steam is introduced to the gas turbine 1 and the combustor 17, while the flow rate and the temperature of the mixed steam are controlled properly. In order to optimize the mixing, the steam flow rate is controlled through opening and closing of the first flow control valve 20 provided in the intermediate-pressure-side steam introduction passage 15, and the flow rate of high-pressure steam is controlled through opening and closing of the second flow control valve 21 provided in the high-pressure steam passage 18 to thereby control the steam temperature. Further, when the intermediate-pressure steam becomes insufficient, by means of backup control, the second flow control valve 21 is opened in order to supply high-pressure steam to thereby secure the required flow rate. Thus, it becomes possible to satisfy two different requirements: i.e., steam temperature adjustment for supplying steam to the blade ring of the gas turbine 1 to thereby maintain a proper clearance, and steam flow-rate adjustment for properly cooling the combustor 17, to thereby achieve control of the clearance of the blade ring portion by means of steam and cooling of the combustor 17 by means of steam.

Flow control means will be described in detail with reference to FIGS. 2 to 4. FIG. 2 shows a block diagram of the first output section 31, FIG. 3 shows a block diagram of the second output section 32 and FIG. 4 shows a block diagram of the third output section 33.

As shown in FIG. 2, detection information output from the temperature detection means T1, the inlet-pressure detection means P2, the outlet-pressure detection means P3, and the outlet-temperature detection means T2 is input to computation means 41 of the first output unit 31. Further, the signal indicative of the output MW of the gas turbine 1 is input to conversion computation means 42 which converts the output MW to a target flow rate of cooling steam, which is then input to the computation means 41. The computation means 41 converts the input information to a target differential pressure and outputs the target differential pressure to addition means 43. The differential pressure detected by the differential-pressure detection means P1 is input to the addition means 43. The addition means 43 obtains the difference between the target differential pressure output from the computation means 41 and the differential pressure detected by the differential-pressure detection means P1. PI computation means 44 calculates an opening command from the thus-obtained difference and outputs the opening command to the first flow control valve 20. Accordingly, the first flow control valve 20 is opened and closed on the basis of the detection information from the differential-pressure detection means P1 so that the flow rate of steam is controlled properly.

As shown in FIG. 3, detection information output from the temperature detection means T1, the inlet-pressure detection means P2, the outlet-pressure detection means P3, and the outlet-temperature detection means T2 is input to computation means 41 of the second output unit 32. Further, the signal indicative of the output MW of the gas turbine 1 is input to second conversion computation means 45 which converts the output MW to a target steam flow rate of backup steam, which is then input to the computation means 41. The computation means 41 converts the input information to a target differential pressure and outputs the target differential pressure to addition means 43. The differential pressure detected by the differential-pressure detection means P1 is input to the addition means 43. The addition means 43 obtains the difference between the target differential pressure output from the computation means 41 and the differential pressure detected by the differential-pressure detection means P1. PI computation means 44 calculates an opening command from the thus-obtained difference.

Meanwhile, the signal indicative of the output MW of the gas turbine 1 is input to temperature setting computation means 46, which converts the output MW to a target steam temperature, which is then input to second addition means 47. The temperature detected by the temperature detection means T1 is input to the second addition means 47. The second addition means 47 obtains the difference between the target steam temperature output from the temperature setting computation means 46 and the temperature detected by the temperature detection means T1. Second PI computation means 48 calculates an opening command from the thus-obtained difference. Accordingly, the second flow control valve 21 is opened and closed on the basis of the detection information from the temperature detection means T1 so that the steam temperature is controlled properly.

Further, a higher-value selection unit 49 compares the opening command (for differential pressure control) from the PI computation means 44 and the opening command (for temperature control) from the second PI computation means 48 and outputs the higher of these values to the second flow control valve 21 as an opening command. Accordingly, the second flow control valve 21 is opened and closed selectively, through either temperature control, on the basis of the detection information from the temperature detection means T1, or differential-pressure control, on the basis of the detection information from the differential-pressure detection means P1 (backup control), so that the steam temperature is controlled properly, and simultaneously the required steam flow rate can be secured. That is, when the flow rate of steam on the side of the intermediate-pressure drum 6 becomes insufficient, differential-pressure control is performed preferentially in order to supply high-pressure steam to thereby secure the required steam flow rate.

As shown in FIG. 4, the signal indicative of the output MW of the gas turbine 1 is input to third conversion computation means 51 of the third output section 33. The third conversion computation means 51 converts the output MW to a target steam temperature, which is set higher than the temperature of intermediate-pressure steam. Meanwhile, the temperature detected by the second temperature detection means T3 is input to third addition means 52. Further, the target steam temperature output from the third conversion computation means 51 is input to the third addition means 52. The third addition means 52 obtains the difference between the target steam temperature output from the third conversion computation means 51 and the temperature detected by the second temperature detection means T3 and third PI computation means 53 calculates an opening command from the thus-obtained difference and outputs the opening command to the third flow control valve 22. Accordingly, the third flow control valve 22 is opened and closed on the basis of the detection information from the second temperature detection means T3 so that the flow rate of intermediate-pressure feed water for temperature decrease is controlled properly.

FIG. 5 shows the relation between steam flow rate and output MW of the gas turbine 1 used when the above-described control is performed. FIG. 6 shows the relation between steam set temperature and output MW of the gas turbine 1 used when the above-described control is performed.

As shown in FIG. 5, the steam flow rate is controlled to increase with the output MW of the gas turbine 1. Further, the control is performed in such a manner that the flow rate of intermediate-pressure steam (shown by a solid line in FIG. 5) determined through open/close control of the first flow control valve 20 becomes higher than the flow rate of high-pressure steam (the flow rate of steam from the high-pressure steam passage, shown by a broken line in FIG. 5) determined through open/close control of the second flow control valve 21.

As shown in FIG. 6, the steam set temperature, on the basis of which the second and third flow control valves 21 and 22 are opened and closed, is set such that the steam set temperature decreases as the output MW of the gas turbine 1 increases. Further, control is performed in such a manner that the flow rate of high-pressure steam and the flow rate of intermediate-pressure feed water decrease as the output MW of the gas turbine 1 increases. For example, the second and third flow control valves 21 and 22 are opened and closed in such a manner that the temperature of steam within the high-pressure steam passage 18 becomes equal to the temperature T1 of intermediate-pressure steam when the output MW of the gas turbine 1 is 100%. In FIG. 6, a solid line indicates steam set temperature for performing open/close control for the second flow control valve 21, and a broken line indicates steam set temperature for performing open/close control for the third flow control valve 22.

In the steam control, the flow rate and temperature of steam introduced to the gas turbine 1 and the combustor 17 are controlled through mixing intermediate-pressure steam and high-pressure steam. Further, when the flow-rate of intermediate-pressure steam becomes insufficient, the high-pressure steam is used as backup steam. However, since the flow rate of high-pressure steam serving as backup steam is limited, the flow rate of high-pressure steam is preferably lowered to a possible degree.

When the flow rate of intermediate-pressure steam is sufficient, i.e., when the second flow control valve 21 is opened and closed by mean of temperature control, the temperature of high-pressure steam is elevated (the flow rate of intermediate-pressure feed water is lowered to thereby reduce the degree of temperature drop), so that the flow rate of intermediate-pressure steam increases, and thus the flow rate of high-pressure steam can be reduced. In contrast, when the flow rate of intermediate-pressure steam is insufficient, i.e., when the second flow control valve 21 is opened and closed by means of the backup control (differential-pressure control), the temperature of high-pressure steam is lowered (the flow rate of intermediate-pressure feed water is increased to thereby increase the degree of temperature drop), so that the supply temperature decreases, and thus the flow rate of high-pressure steam can be reduced. Therefore, the flow rate of high-pressure steam can be reduced through switching the set value for the third flow control valve 22, which controls the temperature of high-pressure steam, depending on whether the second flow control valve 21 is opened and closed by means of temperature control or differential-pressure control.

Figure 7:
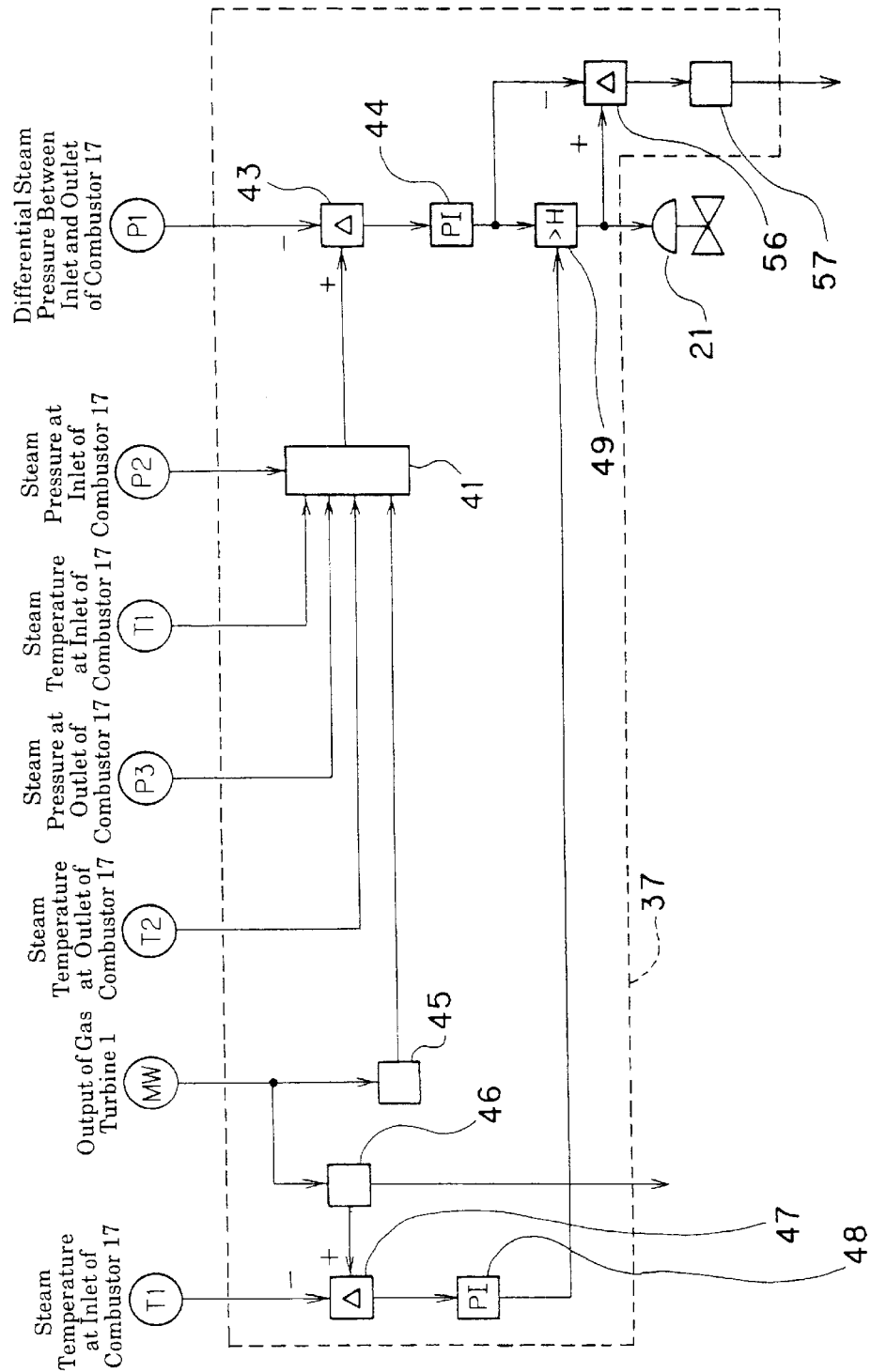
FIG. 7 is a block diagram of a second output section according to a second embodiment of the present invention.
Figure 8:
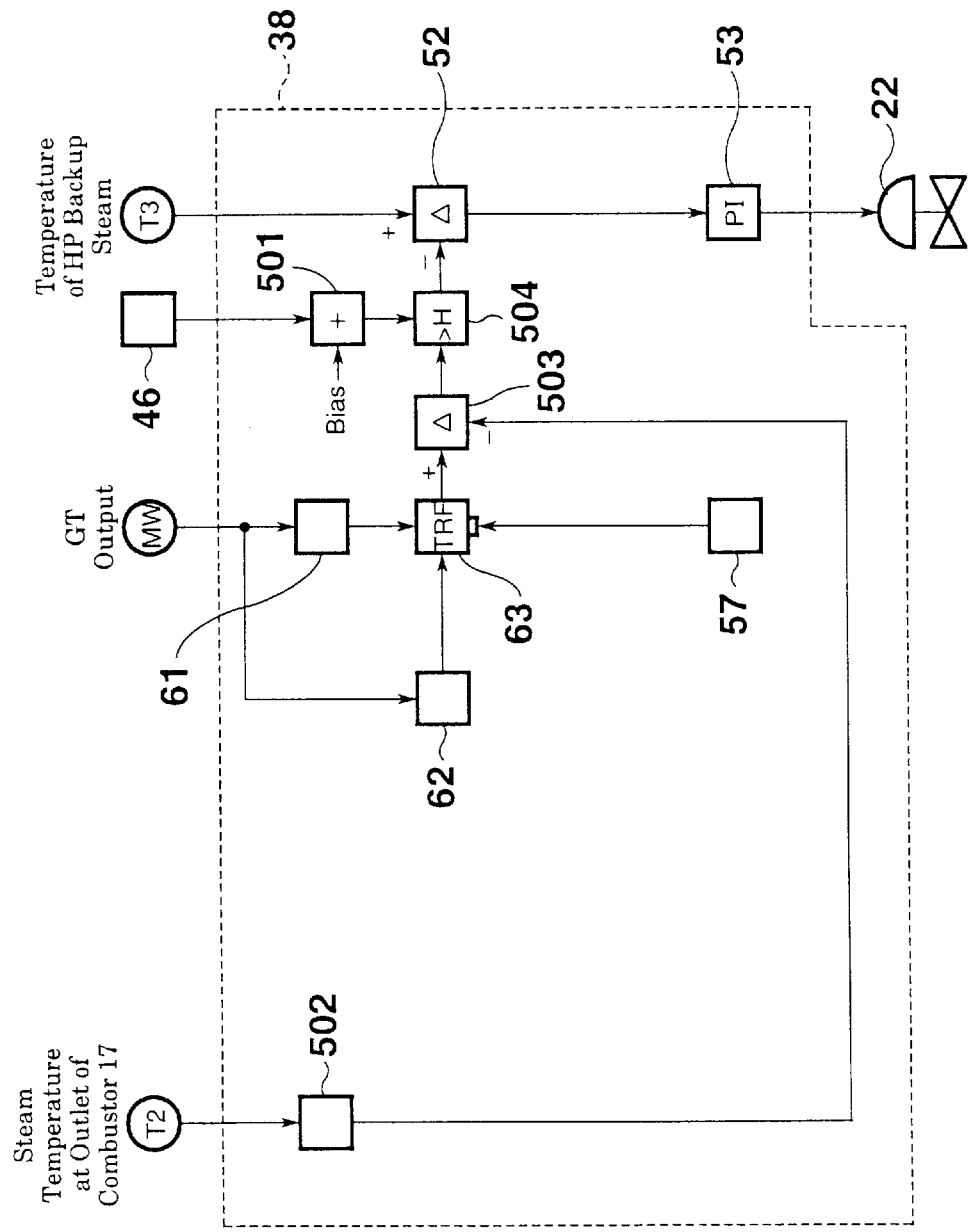
FIG. 8 is a block diagram of a third output section according to the second embodiment of the present invention.

Next, with reference to FIGS. 7 and 8, there will be described an embodiment of the control unit which has a function for judging whether the second flow control valve 21 is controlled by an open/close command issued during temperature control or an open/close command issued during differential-pressure control, and which, during differential-pressure control, shifts the set value for the third flow control valve 22 toward an open side with respect to the value employed during temperature control. FIG. 7 shows a block diagram of a second output section of a control unit according to a second embodiment, which output section outputs an opening command for the second flow control valve 21. FIG. 8 shows a block diagram of a third output section of the control unit according to the second embodiment, which output section outputs an opening command for the third flow control valve 20. Since a first output section 31 for outputting an opening command for the first flow control valve 20 is identical with that shown in FIG. 2 for the first embodiment, its repeated description is omitted.

As shown in FIG. 7, detection information output from the temperature detection means T1, the inlet-pressure detection means P2, the outlet-pressure detection means P3, and the outlet-temperature detection means T2 is input to computation means 41 of the second output unit 37. Further, the signal indicative of the output MW of the gas turbine 1 is input to second conversion computation means 45, which converts the output MW to a target steam flow rate of backup steam, which is then input to the computation means 41. The computation means 41 converts the input information to a target differential pressure and outputs the target differential pressure to addition means 43. The differential pressure detected by the differential-pressure detection means P1 is input to the addition means 43. The addition means 43 obtains the difference between the target differential pressure output from the computation means 41 and the differential pressure detected by the differential-pressure detection means P1 and PI computation means 44 calculates an opening command from the thus-obtained difference.

Meanwhile, the signal indicative of the output MW of the gas turbine 1 is input to temperature setting computation means 46, which converts the output MW to a target steam temperature, which is then input to second addition means 47 and addition means 501, which will be described later. The temperature detected by the temperature detection means T1 is input to the second addition means 47. The second addition means 47 obtains the difference between the target steam temperature output from the temperature setting computation means 46 and the temperature detected by the temperature detection means T1 and second PI computation means 48 calculates an opening command from the thus-obtained difference. Accordingly, the second flow control valve 21 is opened and closed on the basis of the detection information from the temperature detection means T1, so that the steam temperature is controlled properly.

Further, a higher-value selection unit 49 compares the opening command (for differential pressure control) from the PI computation means 44 and the opening command (for temperature control) from the second PI computation means 48, and outputs the higher value to the second flow control valve 21 as an opening command. Accordingly, the second flow control valve 21 is opened and closed selectively, through either temperature control, on the basis of the detection information from the temperature detection means T1, or differential-pressure control, on the basis of the detection information from the differential-pressure detection means P1 (backup control), so that the steam temperature is controlled properly, and simultaneously the required steam flow rate can be secured. That is, when the flow rate of steam on the side of the intermediate-pressure drum 6 becomes insufficient, differential-pressure control is performed preferentially in order to supply high-pressure steam to thereby secure the required steam flow rate.

In the second output section 37, the difference (a command for differential-pressure control) obtained in the PI computation means 44 and the difference selected by the higher-value selection unit 49 (a command for differential-pressure control or a command for temperature control) are input to fourth addition means 56 and added together. For example, the difference obtained in the PI computation means 44 is input to the fourth addition means 56 as a negative value, and the difference selected by the higher-value selection unit 49 is input to the fourth addition means 56 as a positive value. The result of the addition is input to ajudging unit 57, which judges whether the result of the addition is not greater than zero or greater than zero. When the result of the addition is not greater than zero, this means that the second flow control valve 21 is opened and closed by means of differential-pressure control. When the result of the addition is greater than zero, this means that the second flow control valve 21 is opened and closed by means of temperature control. The result of judgment by the judging unit 57 as to whether the second flow control valve 21 is opened and closed by means of temperature control or differential-pressure control is fed to the third output section 38 shown in FIG. 8.

As shown in FIG. 8, the third output section 38 includes fourth conversion computation means 61 and fifth conversion computation means 62 and the signal indicative of the output MW of the gas turbine 1 is input to the fourth conversion computation means 61 and the fifth conversion computation means 62. The fourth conversion computation means 61 converts the output MW to a target steam temperature which is to be used during differential-pressure control. The fifth conversion computation means 62 converts the output MW to a target steam temperature which is to be used during temperature control. The target steam temperature for differential-pressure control obtained through conversion by the fourth conversion computation means 61 is set lower than the target steam temperature for temperature control obtained through conversion by the fifth conversion computation means 62. The target steam temperatures output from the fourth conversion computation means 61 and the fifth conversion computation means 62 are input to a changeover unit 63. The result ofjudgment output from the judging unit 57 of the above-described second output section 37 is input to the changeover unit 63. The changeover unit 63 selects and outputs one of the target steam temperatures, depending on the result of judgment. Specifically, when the judgment result indicates that the result of addition is equal to zero or less, the changeover unit 63 outputs the target steam temperature for differential-pressure control obtained through conversion by the fourth conversion computation means 61. When the judgment result indicates that the result of addition is greater than zero, the changeover unit 63 outputs the target steam temperature for temperature control obtained through conversion by the fifth conversion computation means 62.

Moreover, the third output section 38 includes function means 502 and detection information output from the outlet-temperature detection means T2 is input to the function means 502. The function means 502 stores a function for increasing its output with temperature. Output from the function means 502 is fed to a subtraction input of addition means 503 and output from the changeover unit 63 is fed to an addition input of the addition means 503. The addition means 503 subtracts the output value of the function means 502 from the output value of the changeover unit 63. Meanwhile, the target steam temperature obtained through conversion by the above-described temperature setting computation means 46 is added to addition means 501, in which a predetermined bias value is added to the target steam temperature. The output value obtained through addition of the predetermined bias value and the output value of the addition means 503 are input to a higher-value selection unit 504, which compares these values and outputs the higher one.

Meanwhile, the temperature detected by the second temperature detection means T3 is input to third addition means 52. Further, the target steam temperature output from the higher-value selection unit 504 is input to the third addition means 52. The third addition means 52 obtains the difference between the target steam temperature output from the higher-value selection unit 504 and the temperature detected by the second temperature detection means T3. Third PI computation means 53 calculates an opening command from the thus-obtained difference and outputs the opening command to the third flow control valve 22. Accordingly, the third flow control valve 22 is opened and closed on the basis of the detection information from the second temperature detection means T3 so that the flow rate of intermediate-pressure feed water for temperature decrease is controlled properly by means of temperature control and differential-pressure control.

That is, in the above-described embodiment, when the second flow control valve 21 is opened and closed by means of temperature control, the flow rate of intermediate-pressure feed water decreases and the steam temperature increases, so that the flow rate of intermediate-pressure steam increases (the first flow control valve 20 is opened and closed on the basis of detection information from the differential-pressure detection means P1), and thus the flow rate of high-pressure steam can be reduced. In contrast, when the second flow control valve 21 is opened and closed by means of the backup control (differential-pressure control), the flow rate of intermediate-pressure feed water increases and the steam temperature drops, so that the supply temperature decreases, and thus the flow rate of high-pressure steam can be reduced. Consequently, the flow rate of high-pressure steam can be reduced, and reductions in plant efficiency can be minimized.

Further, since the value obtained through subtraction of the output value of the function means 502 (storing function for increasing its output with temperature) from the output value of the changeover unit 63 is input to the third addition means 52, the opening of the third flow control valve 22 is controlled to increase the degree of opening, so that the temperature (T3) of high-pressure backup steam detected by the second temperature detection means T3 decreases.

However, since the target steam temperature fed to the third addition means 52 (=steam temperature T3) never becomes lower than steam temperature (T1+α) (the temperature T1 of steam obtained through mixing of high-pressure steam and intermediate-pressure steam is lower than the temperature T3 of high-pressure steam), the higher of the value obtained through addition of a predetermined bias value to the output value (=steam temperature T1) of the temperature setting computation means 46 of FIG. 7 and the value obtained through subtraction of the output value of the function means 502 from the target steam temperature is input to the third addition means 52. That is, when the steam temperature at the outlet of the combustor 17 increases, the temperature of high-pressure backup steam is lowered (the preset temperature used for controlling the third flow control valve 22 is lowered within a range higher than the preset inlet steam temperature), so that when the second flow control valve 21 is controlled on the basis of the inlet steam temperature, the flow rate of high-pressure backup steam increases, so that the outlet steam temperature can be lowered. Moreover, even when high-pressure backup steam is introduced by means of differential-pressure control, the outlet steam temperature can be lowered easily through further drop of supply temperature.

Figure 9:
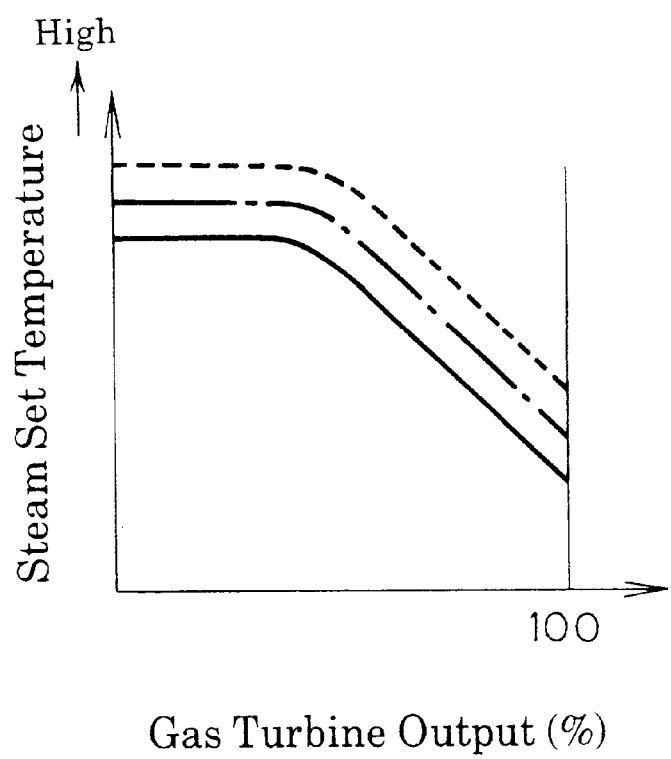
FIG. 9 is a graph showing the relation between gas turbine output and steam set temperature.

FIG. 9 shows the relation between steam set temperature and output MW of the gas turbine 1 used when the above-described control is performed.

As shown in FIG. 9, the steam set temperature, on the basis of which the second and third flow control valves 21 and 22 are opened and closed, is set such that the steam set temperature decreases as the output MW of the gas turbine 1 increases. That is, control is performed in such a manner that the flow rate of high-pressure steam and the flow rate of intermediate-pressure feed water decrease as the output MW of the gas turbine 1 increases. In FIG. 9, a solid line indicates steam set temperature for performing open/close control for the second flow control valve 21, a broken line indicates steam set temperature for performing open/close control for the third flow control valve 22 when the open/close control for the second flow control valve 21 is effected by means of temperature control, and an alternate long and short dash line indicates steam set temperature for performing open/close control for the third flow control valve 22 when the open/close control for the second flow control valve 21 is effected by means of differential-pressure control. Since the steam set temperature for opening and closing the third flow control valve 22 when the open/close control for the second flow control valve 21 is effected by means of temperature control is set higher than the steam set temperature when the open/close control for the second flow control valve 21 is effected by means of differential-pressure control, the third flow control valve 22 is controlled toward a close side as compared with the case of differential-pressure control, so that the flow rate of intermediate-pressure feed water decreases.

Figure 10:
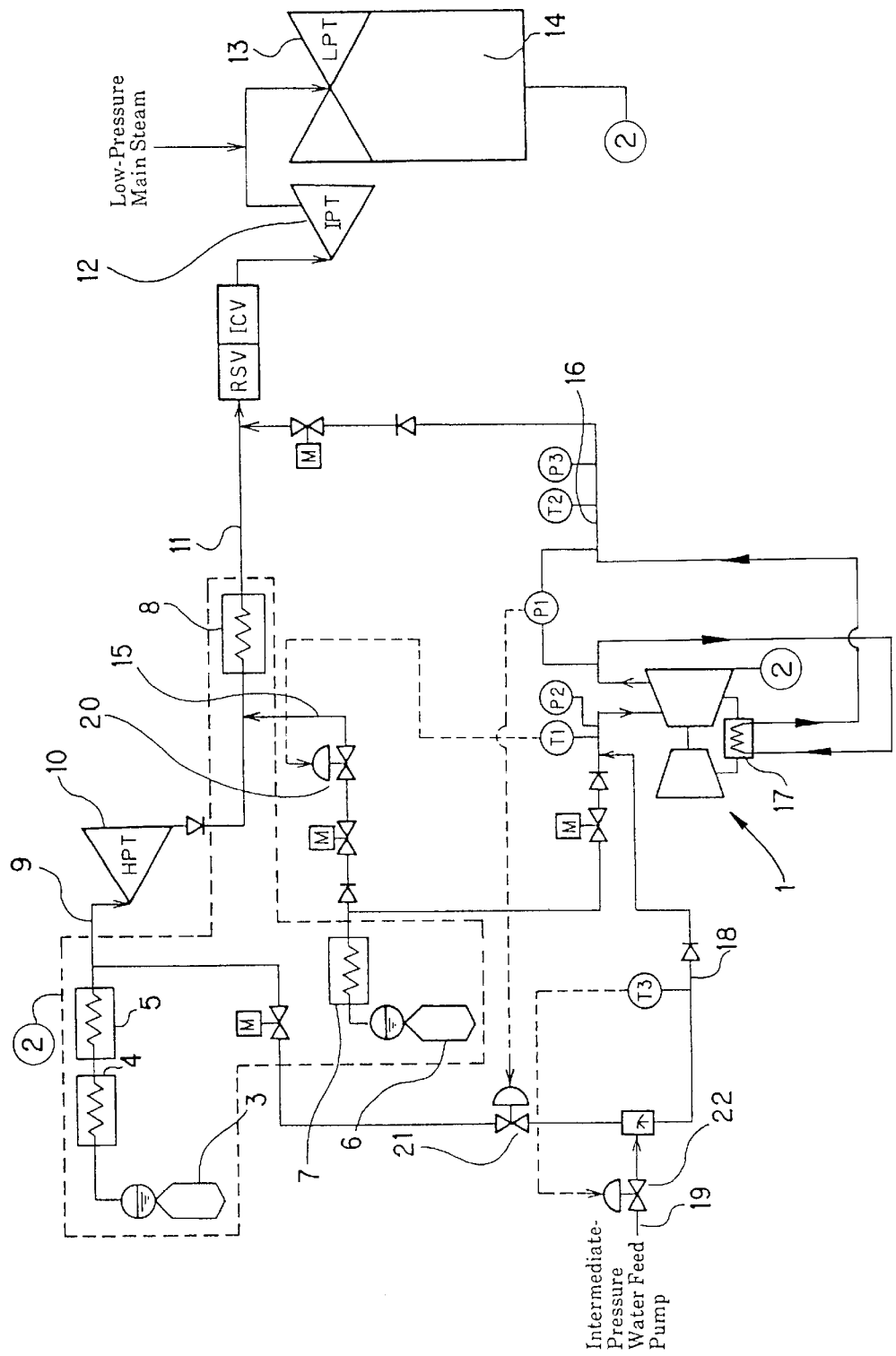
FIG. 10 is a schematic diagram showing the configuration of a combined cycle power generation plant equipped with a steam control apparatus for a turbine according to a third embodiment of the present invention.

A steam control apparatus for a turbine according to a third embodiment of the present invention will be described with reference to FIG. 10. FIG. 10 schematically shows the system of a combined cycle power generation plant equipped with the steam control apparatus for a turbine according to the third embodiment of the present invention. Since the components of the combined cycle power generation plant are identical with those of the combined cycle power generation plant shown in FIG. 1, the components are denoted by the same reference numerals, and their repeated descriptions are omitted.

As shown in FIG. 10, the first flow control valve 20 for controlling the flow rate of intermediate-pressure steam is opened and closed on the basis of detection information output from the temperature detection means T1 and the second flow control valve 21 for controlling the flow rate of high-pressure steam is opened and closed on the basis of detection information output from the differential-pressure detection means P1. Further, the third flow control valve 22 for controlling the flow rate of intermediate-pressure feed water is opened and closed on the basis of detection information output from the second temperature detection means T3. That is, the first flow control valve 20 is opened and closed in accordance with the temperature of steam within the steam passage 16 to thereby control the flow rate of intermediate-pressure steam and the second flow control valve 21 is opened and closed in accordance with the pressure difference between the inlet and outlet of the combustor 17 to thereby control the flow rate of high-pressure steam. The flow rate of intermediate-pressure steam and the flow rate of high-pressure steam are controlled properly such that the flow rate of steam flowing through the steam passage 16 increases as the output of the gas turbine 1 increases, and the steam temperature is lowered to a predetermined temperature.

As in the case of the above-described embodiment, in the steam control apparatus of the third embodiment as well, the temperature and flow rate of steam can be controlled properly through mixing intermediate-pressure steam and high-pressure steam, so that two different requirements, i.e., adjustment of steam temperature and securing of a sufficient steam flow rate, can be satisfied simultaneously.

Notably, the detection means are not limited to those employed in the above-described embodiment, insofar as a modified configuration enables the first flow control valve 20 provided on the intermediate-pressure steam side and the second flow control valve 21 provided on the high-pressure steam side to be opened and closed on the basis of pressure and temperature of steam within the steam passage 16. For example, a modified configuration may be employed in which any one of the illustrated detection means is omitted, and means for directly or indirectly detecting the load of the gas turbine 1, the pressure of each drum, or the clearance of the blade ring portion of the gas turbine 1 is added. Further, the individual detection means may be combined in appropriate manners. Moreover, the fluid introduced from the auxiliary fluid passage 19 is not limited to intermediate-pressure feed water, and any fluid which can lower the temperature of high-pressure steam may be employed.

Figure 11:
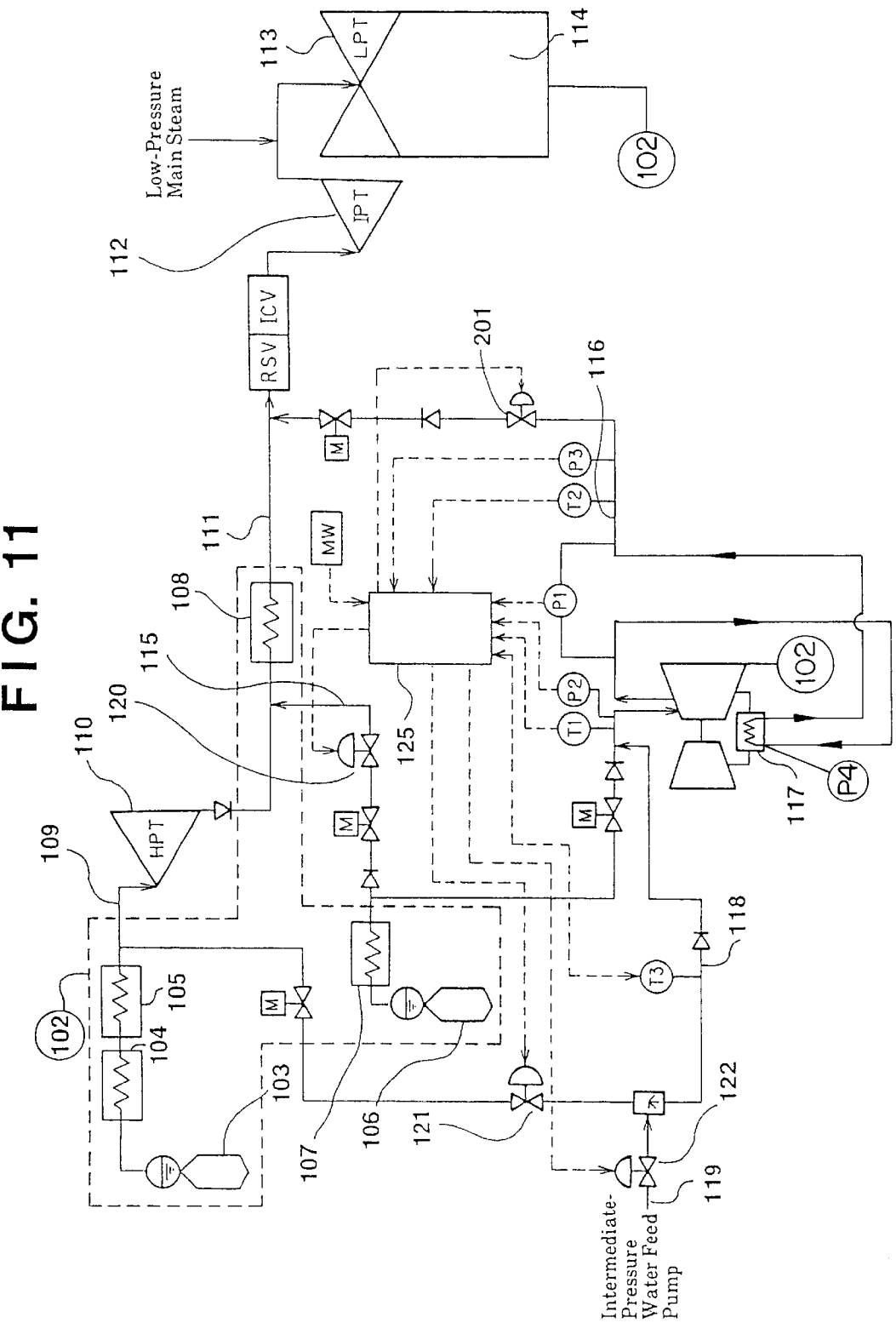
FIG. 11 is a schematic diagram showing the configuration of a combined cycle power generation plant equipped with a steam control apparatus for a turbine according to a fourth embodiment of the present invention.
Figure 12:
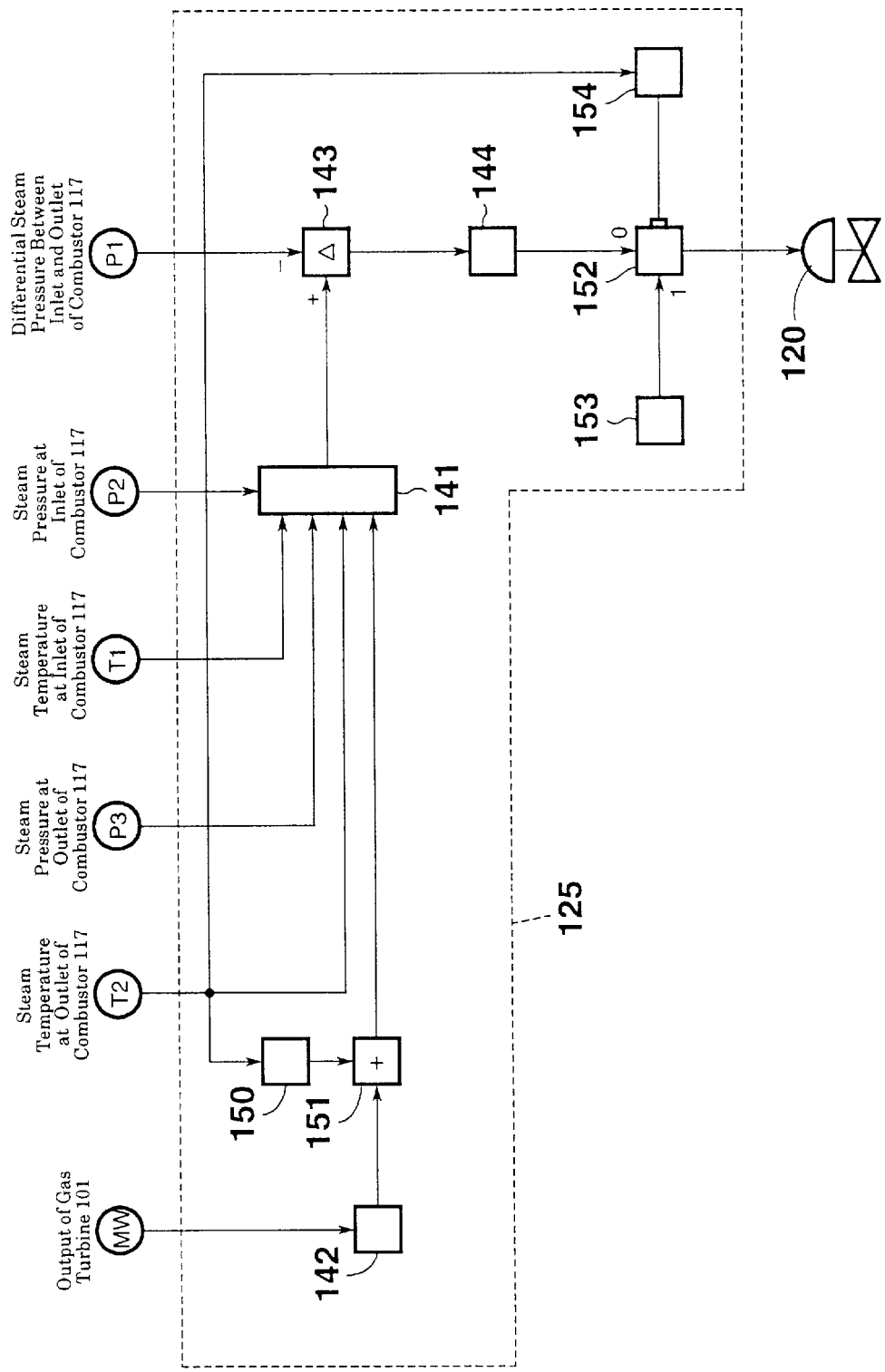
FIG. 12 is a diagram of a control block for controlling a first flow control valve.
Figure 13:
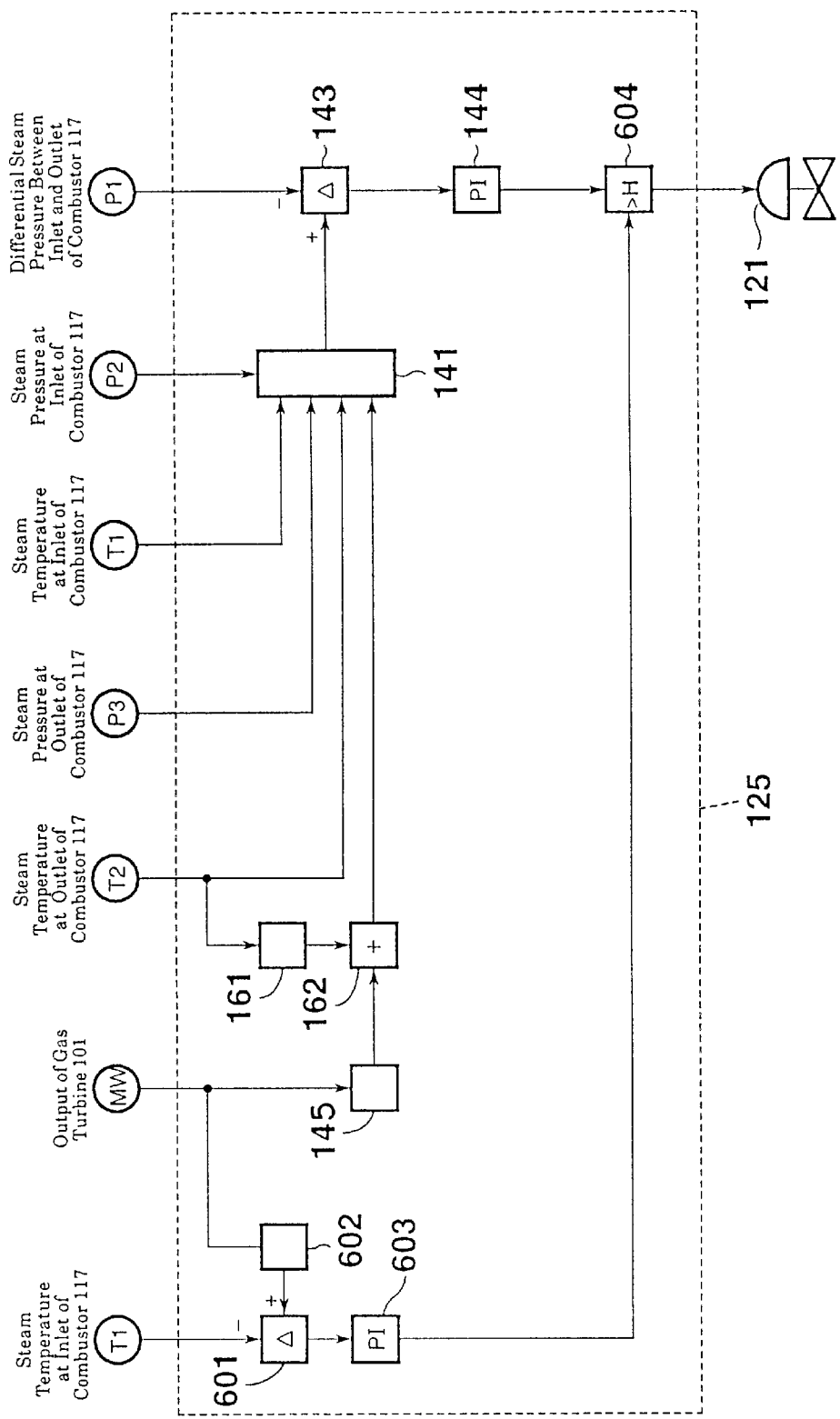
FIG. 13 is a diagram of a control block for controlling a second flow control valve.
Figure 14:
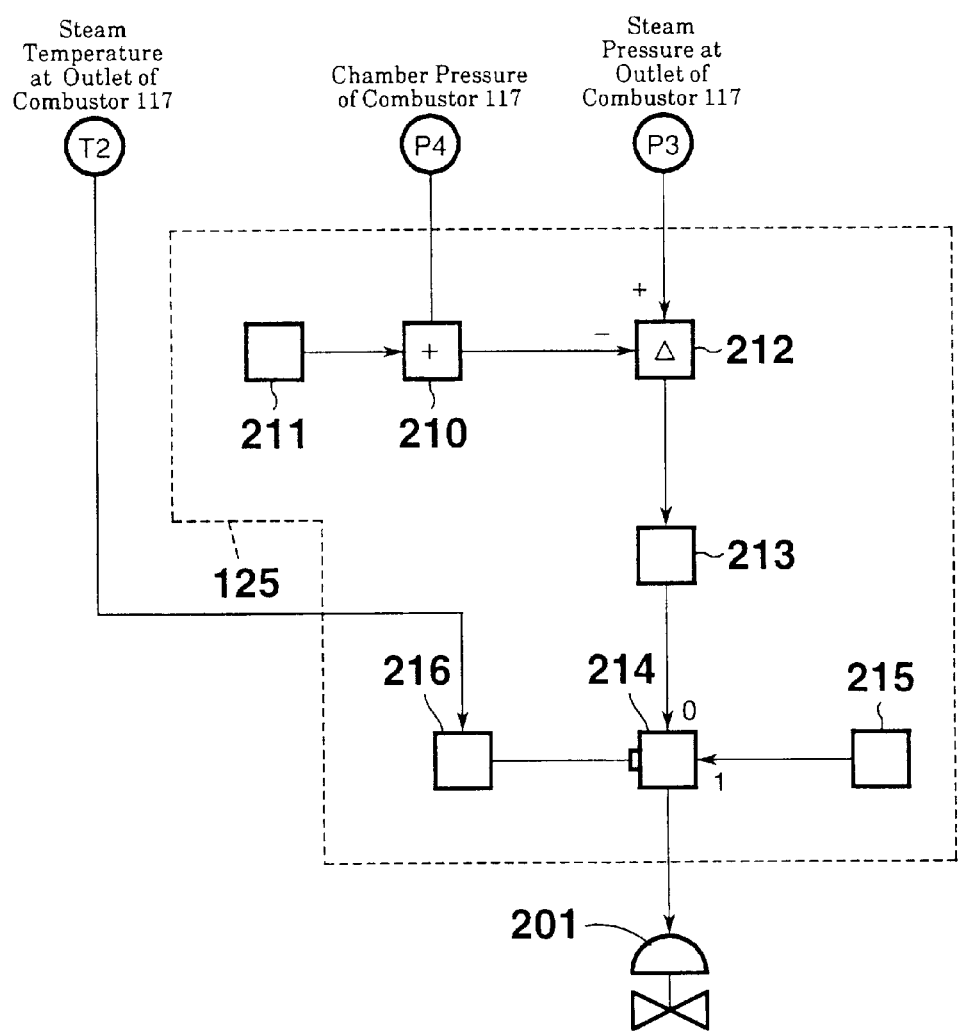
FIG. 14 is a diagram of a control block for controlling a fourth flow control valve.

A fourth embodiment of the present invention will be described with reference to FIGS. 11 to 14. FIG. 11 schematically shows the system of a combined cycle power generation plant equipped with a steam control apparatus for a turbine according to the forth embodiment of the present invention. FIG. 12 shows a control block for controlling a first flow control valve, FIG. 13 shows a control block for controlling a second flow control valve, and FIG. 14 shows a control block for controlling a fourth flow control valve.

As shown in FIG. 11, exhaust gas from a gas turbine 101 is fed to a waste heat recovery boiler 102. In the waste heat recovery boiler 102, a high-pressure drum 103, a first high-pressure superheater 104, and a second high-pressure superheater 105 are provided to form a high-pressure-side unit. An intermediate-pressure drum 106, an intermediate-pressure superheater 107, and a reheater 108 are provided to form a low-pressure-side unit. Steam generated in the high-pressure drum 103 is fed through a high-pressure-side steam introduction passage 109 to a high-pressure steam turbine 110 via the first high-pressure superheater 104 and the second high-pressure superheater 105. Steam discharged from the high-pressure steam turbine 110 is fed through a steam introduction passage 111 to an intermediate-pressure steam turbine 112 via the reheater 108. Steam discharged from the intermediate-pressure steam turbine 112 is fed to a low-pressure steam turbine 113 and is then condensed by a condenser 114. The thus-produced condensate is collected to the waste heat recovery boiler 102. Meanwhile, steam generated in the intermediate-pressure drum 106 is fed through an intermediate-pressure-side steam introduction passage 115, serving as a steam introduction passage, to the intermediate-pressure steam turbine 112 via the intermediate-pressure superheater 107 and the reheater 108.

A steam passage 116 branches off the intermediate-pressure-side steam introduction passage 115. The steam passage 116 provides a bypass flow of steam flowing through the blade ring of the gas turbine 101 and a combustor 117, which is a high-temperature component, and merges into the steam introduction passage 111 on the inlet side of the intermediate-pressure steam turbine 112. A fourth flow control valve 201 is provided in the steam passage 116 to be located on the outlet side of the combustor 117, and the flow rate of steam flowing through the steam passage 116 is controlled through opening and closing the fourth flow control valve 201. Notably, in some cases, the fourth flow control valve 201 is located on the inlet side of the combustor 117 in the steam passage 116. Further, a high-pressure steam passage 118 branches off the high-pressure-side steam introduction passage 109 on the downstream side of the second high-pressure superheater 105. The high-pressure steam passage 118 merges into the steam passage 116 on the upstream side of the gas turbine 101. An auxiliary fluid passage 119 to which water is fed from an intermediate-pressure water feed pump merges into the high-pressure steam passage 118.

A first flow control valve 120 is disposed in the intermediate-pressure-side steam introduction passage 115 to be located on the downstream side of the branching portion where the steam passage 116 branches off. The flow rate of steam which passes through the intermediate-pressure-side steam introduction passage 115 is adjusted through opening and closing of the first flow control valve 120. A second flow control valve 121 is disposed in the high-pressure steam passage 118 to be located on the upstream side of the merging portion of the auxiliary fluid passage 119. The flow rate of high-pressure steam introduced from the high-pressure steam passage 118 to the steam passage 116 is adjusted through opening and closing of the second flow control valve 121. Thus, the temperature of steam in the steam passage 116 is adjusted. Moreover, a third flow control valve 122 serving as an auxiliary fluid pressure control valve is disposed in the auxiliary fluid passage 119. A proper amount of intermediate-pressure feed water is introduced to the high-pressure steam passage 118 through opening and closing of the third flow control valve 122 to thereby lower the temperature of steam within the high-pressure steam passage 118, whereby the temperature of high-pressure steam introduced to the steam passage 116 is controlled to a predetermined temperature.

Temperature detection means T1 is connected to the steam passage 116 to be located between the gas turbine 101 and the merging portion of the high-pressure steam passage 118. The temperature detection means T1 detects the temperature of steam introduced to the gas turbine 101. Differential-pressure detection means P1 is connected to the steam passage 116 so as to detect a difference in steam pressure between the inlet side and the outlet side of the combustor 117 to thereby detect the differential pressure, i.e., flow rate, of steam flowing through the combustor 117. Second temperature detection means T3 serving as an auxiliary steam-temperature detection means is connected to the high-pressure steam passage 118 to be located on the downstream side of the merging portion of the auxiliary fluid passage 119. The second temperature detection means T3 detects the temperature of steam within the high-pressure steam passage 118. In FIG. 11, reference character P2 denotes inlet-pressure detection means for detecting the pressure of steam within the steam passage 116 on the inlet side of the combustor 117. P3 denotes outlet-pressure detection means for detecting the pressure of steam within the steam passage 116 on the outlet side of the combustor 117, and T2 denotes outlet-temperature detection means for detecting the temperature of steam within the steam passage 116 on the outlet side of the combustor 117. The outlet-temperature detection means T2 serves as cooled-steam-temperature detection means. Moreover, chamber-pressure detection means P4 for detecting the chamber pressure of the combustor 117 is provided on the inlet side of the combustor 117.

Detection information output from the temperature detection means T1, the differential-pressure detection means P1, the second temperature detection means T3, the inlet-pressure detection means P2, the outlet-pressure detection means P3, the outlet-temperature detection means T2, and the chamber-pressure detection means P4 is input to a control unit 125. Further, a signal indicative of output MW of the gas turbine 101 is input to the control unit 125. The control unit 125 outputs open/close commands to the first flow control valve 120, the second flow control valve 121, the third flow control valve 122, and the fourth flow control valve 201.

On the basis of the detection information (indicative of differential pressure) output from by the differential-pressure detection means P1, the control unit 125 opens or closes the first flow control valve 120 so as to restrict the flow of steam to the intermediate-pressure steam turbine 112, whereby the flow rate of steam flowing through the combustor 117 is controlled properly. On the basis of the detection information output from the differential-pressure detection means P1 and the temperature detection means T1, the control unit 125 opens or closes the second flow control valve 121, and on the basis of the detection information output from the second temperature detection means T3, the control unit 125 opens or closes the third flow control valve 122, whereby the temperature of steam flowing through the blade ring of the gas turbine 101 and the combustor 117 is controlled properly, while a proper flow rate is maintained. Moreover, on the basis of the detection information output from the chamber-pressure detection means P4, the control unit 125 opens or closes the fourth flow control valve 201, whereby the flow rate of steam flowing through the blade ring of the gas turbine 101 and the combustor 117 is controlled properly.

When the steam temperature increases due to a certain anomalous state, even though the flow rate of steam flowing through the blade ring of the gas turbine 101 and the combustor 117 is maintained at a proper level, on the basis of detection information output from the outlet-temperature detection means T2, the first flow control valve 120, the second flow control valve 121, the third flow control valve 122, and the fourth flow control valve 201 are opened and closed in order to increase the flow rate of steam flowing through the steam passage 116 to thereby prevent an excessive increase of the temperature of steam flowing through the blade ring of the gas turbine 101 and the combustor 117.

Specifically, in the control unit 125, a flow rate of steam necessary to cool the blade ring of the gas turbine 101 and the combustor 117 is calculated, a differential pressure corresponding to the required flow rate of cooling steam is calculated, and an open/close command is output to the first flow control valve 120 such that the differential pressure detected by the differential-pressure detection means P1 becomes equal to the calculated differential pressure. Thus, cooling steam of the required flow rate is introduced to the blade ring of the gas turbine 101 and the combustor 117. Further, in the control unit 125, a steam temperature which the gas turbine 1 requires is calculated and an open/close command is output to the second flow control valve 121 such that the temperature detected by the temperature detection means T1 becomes equal to the calculated temperature. At this time, in the control unit 125, on the basis of the temperature of steam introduced to the steam passage 116 (detection information output from the second temperature detection means T3 and detection information output from the temperature detection means T1), an open/close command is output to the third flow control valve 122, whereby the flow rate of intermediate-pressure feed water is controlled properly, and the temperature of steam within the high-pressure steam passage 118 is lowered to a predetermined temperature. Moreover, in the control unit 125, on the basis of the chamber pressure of the combustor 117, an open/close command is output to the fourth flow control valve 201.

When the flow rate of steam flowing through the blade ring of the gas turbine 101 and the combustor 117 increases or decreases due to temperature control, the first flow control valve 120 is opened or closed on the basis of detection information from the differential-pressure detection means P1 so that the predetermined steam flow rate is secured. When a delay is produced in generation of intermediate-pressure steam due to variation in load or any other cause, and the absolute flow rate of steam flowing through the steam passage 116 becomes insufficient, backup control is performed preferentially over temperature control. In the backup control, the second flow control valve 121 is opened or closed such that the differential pressure detected by the differential-pressure detection means P1 becomes equal to the calculated differential pressure, whereby high-pressure steam is introduced in order to secure the required steam flow rate. That is, even in differential-pressure control, an open/close command is output to the second flow control valve 121, and opening of the second flow control valve 121 is controlled on the basis of the higher of the value of an opening command output by means of temperature control and the value of an opening command output by means of differential-pressure control.

In the above-described steam control apparatus, low-temperature steam generated in the intermediate-pressure drum 106 and high-temperature steam generated in the high-pressure drum 103 are mixed, and the mixed steam is introduced to the blade ring of the gas turbine 101 and the combustor 117, while the flow rate and the temperature of the mixed steam are controlled properly. In order to optimize the mixing, the flow rate of steam is controlled through opening and closing of the first flow control valve 120 provided in the intermediate-pressure-side steam introduction passage 115, and the flow rate of high-pressure steam is controlled through opening and closing of the second flow control valve 121 provided in the high-pressure steam passage 118 to thereby control the steam temperature. Further, when the intermediate-pressure steam becomes insufficient, by means of backup control, the second flow control valve 121 is opened in order to supply high-pressure steam to thereby secure the required flow rate. Moreover, the fourth flow control valve 201 is opened and closed in accordance with the chamber pressure of the combustor 117 to thereby control the flow rate of steam flowing through the steam passage 116. Therefore, it becomes possible to satisfy two different requirements, i.e., steam temperature adjustment for supplying steam to the blade ring of the gas turbine 101 to thereby maintain a proper clearance, and steam flow-rate adjustment for properly cooling the combustor 117, to thereby achieve control of the clearance of a blade ring portion by means of steam and cooling of the combustor 117 by means of steam simultaneously.

The status of controlling the first flow control valve 120, the second flow control valve 121, and the fourth flow control valve 201 will be described in detail with reference to FIGS. 12 to 14. FIG. 12 shows a control block for controlling the first flow control valve 120, FIG. 13 shows a control block for controlling the second flow control valve 121, and FIG. 14 shows a control block for controlling the fourth flow control valve 201.

As shown in FIG. 12, detection information output from the temperature detection means T1, the inlet-pressure detection means P2, the outlet-pressure detection means P3, and the outlet-temperature detection means T2 is input to computation means 141 of the control unit 125. Further, the signal indicative of the output MW of the gas turbine 101 is input to conversion computation means 142, which converts the output MW to a target steam flow rate, which is then input to addition means 151. Meanwhile, function means 150 computes a bias on the basis of the detection information (temperature) output from the outlet-temperature detection means T2. The addition means 151 adds the bias to the target steam flow rate, and outputs the thus-obtained value to the computation means 141.

Specifically, the bias value is set such that the target flow rate of cooling steam increases with the steam temperature detected by the outlet-temperature detection means T2. That is, as the steam temperature detected by the outlet-temperature detection means T2 increases, the degree of opening of the first flow control valve 120 is decreased so as to increase the flow rate of steam fed to the steam passage 116. The computation means 141 converts the input information to a target differential pressure and outputs the target differential pressure to addition means 143. The differential pressure detected by the differential-pressure detection means P1 is input to the addition means 143. The addition means 143 obtains the difference between the target differential pressure output from the computation means 141 and the differential pressure detected by the differential-pressure detection means P1. PI computation means 144 calculates an opening command from the thus-obtained difference and outputs the opening command to the input 0 of selection means 152. A complete-close command (minimum opening, e.g., 3 to 5% opening) is supplied from command means 153 to the input 1 of the selection means 152.

In an ordinary state, the selection means 152 is maintained off and enters an on state upon reception of a command from comparison means 154. That is, when the selection means 152 enters the on state, in place of the command fed to the input 0, the command fed to the input 1 is output as an output command. When the selection means 152 is in the off state, the opening command fed to the input 0 (the opening command corresponding to the output MW of the gas turbine 101 and the status of the steam passage 116) is output to the first flow control valve 120, and when the selection means 152 is in the on state, the opening command fed to the input 1 (the complete-close command) is output to the first flow control valve 120. Detection information output from the outlet-temperature detection means T2 is input to the comparison means 154, which outputs the result of comparison to the selection means 152. When the comparison means 154 judges that the temperature detected by the outlet-temperature detection means T2 is higher than a predetermined value (upper limit), the comparison means 154 outputs an on signal to the selection means 152, so that the selection means 152 selects the opening command fed to the input 1.

Accordingly, the first flow control valve 120 is opened and closed on the basis of the output MW of the gas turbine 101 and the status of the steam passage 116 in such a manner that the flow rate of steam flowing through the steam passage 116 attains a predetermined level. Further, when the temperature of steam on the outlet side of the combustor 117 detected by the outlet-temperature detection means T2 increases, the first flow control valve 120 is controlled such that its opening decreases. Thus, the flow rate of steam flowing through the steam passage 116 is increased. Moreover, when the temperature detected by the outlet-temperature detection means T2 exceeds the predetermined value (upper limit), the first flow control valve 120 is closed completely by means of the complete close command (minimum opening command), so that the entirety of steam from the intermediate-pressure drum 106 is fed to the steam passage 116.

As shown in FIG. 13, detection information output from the temperature detection means T1, the inlet-pressure detection means P2, the outlet-pressure detection means P3, and the outlet-temperature detection means T2 is input to the computation means 141 of the control unit 125. Further, the signal indicative of the output MW of the gas turbine 101 is input to second conversion computation means 145, which converts the output MW to a target flow rate of backup steam, which is then input to addition means 162. Meanwhile, function means 161 computes a bias on the basis of the detection information (temperature) output from the outlet-temperature detection means T2. The addition means 162 adds the bias to the target flow rate of backup steam, and outputs the thus-obtained value to the computation means 141.

The computation means 141 converts the input information to a target differential pressure and outputs the target differential pressure to addition means 143. The differential pressure detected by the differential-pressure detection means P1 is input to the addition means 143. The addition means 143 obtains the difference between the target differential pressure output from the computation means 141 and the differential pressure detected by the differential-pressure detection means P1, and PI computation means 144 calculates an opening command from the thus-obtained difference.

Specifically, the bias value is set such that the target flow rate of cooling steam increases with the steam temperature detected by the outlet-temperature detection means T2. That is, as the steam temperature detected by the outlet-temperature detection means T2 increases, the degree of opening of the second flow control valve 121 is increased so as to increase the flow rate of steam fed from the high-pressure steam passage 118 to the steam passage 116.

Meanwhile, the temperature detected by the temperature detection means T1 is input, as a subtraction-side value, to addition means 601. The signal indicative of the output MW of the gas turbine 101 is input to temperature setting computation means 602, which converts the output MW to a target steam temperature, which is then input, as an addition-side value, to addition means 601. The addition means 601 obtains the difference between the target steam temperature output from the temperature setting computation means 602 and the temperature detected by the temperature detection means T1 and PI computation means 603 calculates an opening command from the thus-obtained difference. Further, a higher-value selection unit 604 compares the opening command (for differential pressure control) from the PI computation means 603 and the opening command (for temperature control) from the second PI computation means 144, and outputs the higher value to the second flow control valve 121 as an opening command.

Accordingly, the second flow control valve 121 is opened and closed on the basis of the output MW of the gas turbine 101 and the status of the steam passage 116 in such a manner that the flow rate of steam flowing through the steam passage 116 attains a predetermined level. Further, when the temperature of steam on the outlet side of the combustor 117 detected by the outlet-temperature detection means T2 increases, the second flow control valve 121 is opened in order to increase the flow rate of steam flowing through the steam passage 116. Moreover, the second flow control valve 121 is opened and closed selectively through either temperature control, on the basis of the detection information from the temperature detection means T1, or differential-pressure control, on the basis of the detection information from the differential-pressure detection means P1 (backup control), so that the steam temperature is controlled properly, and simultaneously the required steam flow rate can be secured. That is, when the flow rate of steam on the side of the intermediate-pressure drum 106 becomes insufficient, differential-pressure control is performed preferentially in order to introduce high-pressure steam to thereby secure the required steam flow rate.

As shown in FIG. 14, a command value output from command means 211 and a value (pressure) output from the chamber-pressure detection means P4 are input to addition means 210 of the control unit 125. The addition means 210 adds these values to thereby obtain a target steam pressure, which is then fed to addition means 212. The addition means 212 calculates the difference between the target steam pressure and the pressure detected by the outlet-pressure detection means P3. PI computation means 213 calculates an opening command from the thus-obtained difference and outputs the opening command to the input 0 of selection means 214. A full-open command is supplied from command means 215 to the input 1 of the selection means 214.

In an ordinary state, the selection means 214 is maintained off and enters an on state upon reception of a command from comparison means 216. That is, when the selection means 214 enters the on state, in place of the command fed to the input 0, the command fed to the input 1 is output as an output command. When the selection means 214 is in the off state, the opening command fed to the input 0 (the opening command corresponding to the chamber pressure and the pressure on the outlet side of the combustor 117) is output to the fourth flow control valve 201, and when the selection means 214 is in the on state, the opening command fed to the input 1 (the full-open command) is output to the fourth flow control valve 201. Detection information output from the outlet-temperature detection means T2 is input to the comparison means 216, which outputs the result of comparison to the selection means 214. When the comparison means 216 judges that the temperature detected by the outlet-temperature detection means T2 is higher than a predetermined value (upper limit), the comparison means 216 outputs an on signal to the selection means 214 so that the selection means 214 selects the opening command fed to the input 1.

Accordingly, when the temperature of steam on the outlet side of the combustor 117 increases and the temperature detected by the outlet-temperature detection means T2 exceeds the predetermined value (upper limit), the fourth flow control valve 201 is opened fully in order to increase the flow rate of cooling steam. By virtue of this control, the flow rate of cooling steam is increased also in the case in which the temperature of cooling steam exceeds the predetermined value (upper limit) despite the flow rate of cooling steam being controlled to a predetermined level.

Therefore, when the temperature of steam on the outlet side of the combustor 117 increases, the flow rate of cooling steam is increased as the temperature detected by the outlet-temperature detection means T2 increases, and when the temperature detected by the outlet-temperature detection means T2 exceeds the predetermined value (upper limit), the entirety of steam fed from the intermediate-pressure drum 106 is fed to the steam passage 116, and the fourth flow control valve 201 is opened fully in order to increase the flow rate of cooling steam. This operation enables the blade ring of the gas turbine 101 and the combustor 117 to be protected when the temperature of cooling steam increases despite the flow rate of cooling steam being controlled to a predetermined level.

Accordingly, when there arises a possibility of the blade ring of the gas turbine 101 and the combustor 117 being damaged due to an increase in the temperature of cooling steam supplied thereto, the flow rate of cooling steam introduced to the blade ring of the gas turbine 101 and the combustor 117 is increased in order to protect the blade ring and the combustor 117. Accordingly, the steam control apparatus of the present invention can protect the blade ring of the gas turbine 101 and the combustor 117, without use of an interlock function, even when the outlet side temperature of the combustor 117 increases.

Therefore, it becomes possible to satisfy two different requirements, i.e., steam temperature adjustment for supplying steam to the blade ring of the gas turbine 101 to thereby maintain a proper clearance, and steam flow-rate adjustment for properly cooling the combustor 117, while protecting the blade ring and the combustor 17. Thus, it becomes possible to simultaneously achieve control of the clearance of a blade ring portion by means of steam and cooling of the combustor 117 by means of steam with high reliability.

When the outlet temperature of the combustor 117 increases, the control for opening and closing the first and second flow control valves 120 and 121 is performed in such a manner that the first flow control valve 120 is closed in order to feed steam from the intermediate-pressure drum 106 to the steam passage 116, and if the outlet temperature of the combustor 117 is still high even after the first flow control valve 120 is fully opened, the second flow control valve 121 is opened in order to increase the flow rate of steam fed from the high-pressure steam passage 118. Further, when the outlet temperature of the combustor 117 exceeds the predetermined value (upper limit), the fourth flow control valve 201 is opened fully in order to increase the flow rate of cooling steam. It is to be noted that the control for opening and closing the first and second flow control valves 120 and 121 is designed properly in accordance with the capacity of the facility and other factors, and is performed in combination with opening and closing of other control valves, in order to simultaneously obtain a predetermined flow rate and temperature. Further, the control for opening and closing the fourth flow control valve 201 may be modified such that the flow control valve 201 opens and closes properly in accordance with the increased temperature before the outlet temperature of the combustor 117 exceeds the predetermined value (upper limit), and is fully opened when the outlet temperature of the combustor 117 exceeds the predetermined value (upper limit).

What is claimed is:

1. A steam control apparatus for a turbine, comprising:
   a waste heat recovery boiler including a high-pressure unit for generating high-pressure steam by use of exhaust gas of the gas turbine, and a low-pressure unit for generating low-pressure steam by use of exhaust gas of the gas turbine;
   a steam turbine operated by means of steam generated by the waste heat recovery boiler;
   a low-pressure-side steam introduction passage for introducing low-pressure steam from the low-pressure unit of the waste heat recovery boiler to the steam turbine;
   a high-pressure-side steam introduction passage for introducing high-pressure steam from the high-pressure unit of the waste heat recovery boiler to the steam turbine;
   a steam passage branching off the low-pressure-side steam introduction passage and serving as a bypass for introducing low-pressure steam from the low-pressure unit to a blade ring of the gas turbine and a high-temperature component;
   a high-pressure steam passage branching off the high-pressure-side steam introduction passage and merging into the steam passage on the upstream side of the blade ring of the gas turbine and the high-temperature component; and
   a flow-rate adjustment-control unit for adjusting the flow rate of steam flowing through the steam passage and the flow rate of steam flowing through the high-pressure steam passage to thereby adjust the flow rate and temperature of steam flowing through the blade ring of the gas turbine and the high-temperature component.

2. A steam control apparatus for a turbine according to claim 1, wherein the flow-rate adjustment-control unit comprises:
   a first flow control valve provided in the low-pressure-side steam introduction passage on the downstream side of a branching portion of the steam passage and adapted to control the flow rate of steam flowing through the steam passage through adjustment of the flow rate of steam flowing through the steam turbine;
   a second flow control valve provided in the high-pressure steam passage and adapted to control the temperature of steam flowing through the steam passage through adjustment of the flow rate of high-pressure steam;
   a temperature detector for detecting the temperature of steam flowing thorough the steam passage on the downstream side of a merging portion of the high-pressure steam passage;
   a pressure detector for detecting the pressure of steam flowing through the steam passage on the downstream side of the merging portion of the high-pressure steam passage; and
   a control unit for controlling the first and second flow control valves on the basis of the temperature detected by the temperature detector and the pressure detected by the pressure detector in order to maintain at predetermined values the flow rate and temperature of steam flowing through the blade ring of the gas turbine and the high-temperature component.

3. A steam control apparatus for a turbine according to claim 2, wherein:
   the high-temperature component is a combustor;
   the pressure detector is a differential-pressure detector for detecting a difference in steam pressure between the inlet and outlet of the combustor;
   an auxiliary fluid introduction passage having a third flow control valve merges into the high-pressure steam passage on the downstream side of the second flow control valve;
   a second temperature detector is provided in the high-pressure steam passage on the downstream side of a merging portion of the auxiliary fluid introduction passage; and
   the control unit has a function for opening and closing the first flow control valve on the basis of detection information output from the differential-pressure detector, opening and closing the second flow control valve on the basis of detection information output from the differential-pressure detector and detection information output from the temperature detector, and opening and closing the third flow control valve on the basis of detection information output from the second temperature detector, such that the flow rate of steam flowing through the steam passage increases with output of the gas turbine, and the steam temperature decreases to a predetermined temperature.

4. A steam control apparatus for a turbine according to claim 3, wherein the control unit has a function used when the second flow control valve is opened and closed on the basis of detection information output from the differential-pressure detector and detection information output from the temperature detector, the function being adapted to compare an open/close command determined on the basis of the detection information output from the differential-pressure detector and an open/close command determined on the basis of the detection information output from the temperature detector and open and close the second flow control valve on the basis of the open/close command which designates a larger opening.

5. A steam control apparatus for a turbine according to claim 4, wherein the control unit has a function for judging whether the second flow control valve is opened and closed on the basis of the open/close command derived from the detection information output from the differential-pressure detector or the open/close command derived from the detection information output from the temperature detector and a function for setting the opening of the third flow control valve for a case in which the open/close command determined on the basis of the detection information from the differential-pressure detector is used, such that the opening becomes greater than that of the third flow control valve for the case in which the open/close command determined on the basis of the detection information from the temperature detector is used.

6. A steam control apparatus for a turbine according to claim 2, wherein:
   the high-temperature component is a combustor;
   the pressure detector is a differential-pressure detector for detecting a difference in steam pressure between the inlet and outlet of the combustor;
   an auxiliary fluid introduction passage having a third flow control valve merges into the high-pressure steam passage on the downstream side of the second flow control valve;
   a second temperature detector is provided in the high-pressure steam passage on the downstream side of a merging portion of the auxiliary fluid introduction passage; and the control unit has a function for opening and closing the first flow control valve on the basis of detection information output from the temperature detector, opening and closing the second flow control valve on the basis of detection information output from the differential-pressure detector, and opening and closing the third flow control valve on the basis of detection information output from the second temperature detector, such that the flow rate of steam flowing through the steam passage increases with output of the gas turbine, and the steam temperature is lowered to a predetermined temperature.

* * * * *